US012639541B2

(12) United States Patent
Terhalle et al.

(10) Patent No.: US 12,639,541 B2
(45) Date of Patent: May 26, 2026

(54) METHOD FOR PRODUCING A MULTILAYER BODY, MULTILAYER BODY, METHOD FOR AUTHENTICATING A MULTILAYER BODY, AND AUTHENTICATION SYSTEM

(71) Applicants: SCRIBOS GmbH, Heidelberg (DE); OVD Kinegram AG, Zug (CH); LEONHARD KURZ Stiftung & Co. KG, Fürth (DE)

(72) Inventors: Bernd Terhalle, Heidelberg (DE); Stefan Borgsmüller, Heidelberg (DE); Harald Walter, Zug (CH); Jürgen Metzger, Fürth (DE)

(73) Assignees: SCRIBOS GmbH, Heidelberg (DE); OVD Kinegram AG, Zug (CH); LEONHARD KURZ Stiftung & Co. KG, Fürth (DE)

(*) Notice: Subject to any disclaimer, the term of this patent is extended or adjusted under 35 U.S.C. 154(b) by 0 days.

(21) Appl. No.: 18/871,897

(22) PCT Filed: Jun. 5, 2023

(86) PCT No.: PCT/EP2023/064962
§ 371 (c)(1),
(2) Date: Dec. 5, 2024

(87) PCT Pub. No.: WO2023/237476
PCT Pub. Date: Dec. 14, 2023

(65) Prior Publication Data
US 2025/0356155 A1 Nov. 20, 2025

(30) Foreign Application Priority Data
Jun. 9, 2022 (DE) ..................... 10 2022 114 564.6

(51) Int. Cl.
| | |
|---|---|
| *G06K 19/06* | (2006.01) |
| *G06V 30/224* | (2022.01) |
| *G06V 30/302* | (2022.01) |

(52) U.S. Cl.
CPC . *G06K 19/06103* (2013.01); *G06K 19/06037* (2013.01); *G06V 30/302* (2022.01); *G06V 30/224* (2022.01)

(58) Field of Classification Search
CPC ....... G06K 19/06103; G06K 19/06037; G06V 30/302; G06V 30/224
See application file for complete search history.

(56) References Cited

U.S. PATENT DOCUMENTS

| | | | |
|---|---|---|---|
| 8,746,555 | B2 | 6/2014 | Callegari et al. |
| 2005/0093856 | A1 | 5/2005 | Borgsmuller et al. |
| 2010/0060944 | A1 | 3/2010 | Swift et al. |

FOREIGN PATENT DOCUMENTS

| | | |
|---|---|---|
| DE | 103 45 898 A1 | 1/2005 |
| DE | 10 2017 206 466 A1 | 10/2018 |

(Continued)

OTHER PUBLICATIONS

International Search Report dated Sep. 4, 2023.
Examination Report dated Mar. 2, 2023.

*Primary Examiner* — Kristy A Haupt
(74) *Attorney, Agent, or Firm* — Hoffman & Baron, LLP

(57) ABSTRACT

A method for producing a multilayer body (1), in particular laminating film or transfer film, wherein a replication layer (12) is applied to a carrier layer (11), and a first graphic code (21) is Fourier-transformed into a two-dimensional Fourier pattern (23) and the two-dimensional Fourier pattern (23) is binarized in order to obtain a binarized two-dimensional Fourier pattern (24), and the binarized two-dimensional Fourier pattern (24) is transferred onto a stamping tool, and the binarized two-dimensional Fourier pattern (24) is (Continued)

molded as a stamping structure into the replication layer (12) at least partially in a first region by means of the stamping tool.

58 Claims, 8 Drawing Sheets

(56)                    References Cited

FOREIGN PATENT DOCUMENTS

| DE | 10 2017 215 288 | B3 | 12/2018 | |
| DE | 102019207856 | A1 * | 12/2020 | ........... G07D 7/2008 |
| EP | 3 388 250 | A1 | 10/2018 | |
| EP | 2 153 422 | B1 | 1/2019 | |
| WO | 2008/058331 | A1 | 5/2008 | |
| WO | 2008/128714 | A1 | 10/2008 | |
| WO | 2018/189033 | A1 | 10/2018 | |
| WO | 2020/239867 | A1 | 12/2020 | |

* cited by examiner

METHOD FOR PRODUCING A MULTILAYER BODY, MULTILAYER BODY, METHOD FOR AUTHENTICATING A MULTILAYER BODY, AND AUTHENTICATION SYSTEM

This application is a National Stage application based on an International Application filed under the Patent Cooperation Treaty PCT/EP2023/064962, filed Jun. 5, 2023, which claims priority to DE 102022114564.6, filed Jun. 9, 2022.

BACKGROUND OF THE INVENTION

The invention relates to a method for producing a multilayer body, and a multilayer body. The invention also relates to a method for authenticating a multilayer body, as well as an authentication system.

It is known to equip multilayer bodies with security features for protection against forgery. In addition to a range of holograms, Fourier patterns are also suitable for this.

From DE 102017206466 A1, a method for producing a security feature is known in which a machine-readable graphic code is provided, the graphic code is embedded in a two-dimensional discrete complex function, the two-dimensional discrete complex function is Fourier-transformed and is binarized to form a two-dimensional image. The binarized Fourier image is printed in a pixel resolution which is high enough that the machine-readable graphic code is no longer readable after back transformation in the case of a copy of this binarized Fourier image by means of conventional printers and copiers with a max. scan or print resolution of 600×600 dpi. By a scan or print resolution of 600×600 dpi is meant the data printed by the printer. The dpi values specified in the case of conventional printers and copiers are not always achieved in reality.

However, a disadvantage of the already known method and multilayer body is that the Fourier pattern is applied by means of digital printing. Such multilayer bodies are therefore fundamentally susceptible to imitation and copying attempts by skillful people with professional equipment (so-called expert copies), in particular with scan or print resolutions of more than 600 dpi.

SUMMARY OF THE INVENTION

The object of the invention now is to specify a method for producing a multilayer body, as well as a multilayer body, in which the protection against forgery is increased and in addition production is not restricted to digital printing methods.

The object is achieved by a method for producing a multilayer body, in particular laminating film or transfer film, wherein a replication layer is applied to a carrier layer, and a first graphic code is Fourier-transformed into a two-dimensional Fourier pattern and the two-dimensional Fourier pattern is binarized in order to obtain a binarized two-dimensional Fourier pattern, and the binarized two-dimensional Fourier pattern is transferred into a stamping tool, and the binarized two-dimensional Fourier pattern is molded as a stamping structure into the replication layer at least partially in a first region by means of the stamping tool.

The object is further achieved by a multilayer body, in particular laminating film or transfer film, preferably produced according to one of claims 1 to 32, wherein the multilayer body has a carrier layer and a replication layer arranged thereon, wherein an embedded first graphic code Fourier-transformed into a binarized two-dimensional Fourier pattern is molded as a stamping structure in the replication layer at least partially in a first region.

This object is further achieved by a method for authenticating a multilayer body, in particular according to one of claims 33 to 52, particularly preferably produced with a method according to claims 1 to 32, with an authentication system, by capturing an image of the binarized two-dimensional Fourier pattern of the multilayer body with a camera of a mobile terminal, Fourier back-transforming the captured image and supplying the Fourier back-transformed image to a first read algorithm for the first graphic code and reading out the first graphic code and checking the first graphic code.

Furthermore, the object is also achieved by an authentication system for authenticating a multilayer body according to one of claims 33 to 52, in particular produced with a method according to one of claims 1 to 32, with a mobile terminal with a camera for capturing the image of the binarized two-dimensional Fourier pattern of the multilayer body protected against forgery and a transceiver unit, with which data of the multilayer body captured by the camera can be transmitted to an authentication server, a Fourier back-transformation program, with which the binarized two-dimensional Fourier pattern can be Fourier back-transformed, a first read algorithm for the first graphic code, which is read out from the Fourier back-transformed image, with an authentication server, which is in data-carrying connection with the mobile terminal and on which read-out first graphic code stored multilayer body, in particular the batch number, are stored and on which the read-out first graphic code transmitted by the mobile terminal, in particular batch number, can be authenticated and with which an authentication signal can be output to the mobile terminal.

It has been shown here that a multilayer body in which a first graphic code is contained in a binarized two-dimensional Fourier pattern is obtained through the multilayer body according to the invention, the method according to the invention for producing a multilayer body, the method for authenticating a multilayer body and the authentication system. The binarized two-dimensional Fourier pattern is introduced into the multilayer body as a stamping structure. The binarized two-dimensional Fourier pattern can thus be read out by an authentication system and at the same time provides the binarized two-dimensional Fourier pattern with an increased protection against forgery because of the optical variability brought about by the stamping structure. Due to the optical variability, it is therefore not possible to copy the binarized two-dimensional Fourier pattern using conventional printing or copying.

Moreover, with the multilayer body according to the invention and the method according to the invention for producing a multilayer body, a multilayer body is obtained in which the binarized two-dimensional Fourier pattern is not introduced or applied by means of digital printing. In the case of Fourier patterns applied by means of digital printing, it has until now been necessary to print these Fourier patterns in part with a print resolution of up to 1200 dpi. In order to be able to print such high resolutions in high quality, very expensive printers are needed. Through the multilayer body according to the invention and the method according to the invention for producing a multilayer body, it is now possible to introduce the Fourier pattern into the multilayer body without digital printing.

The binarized two-dimensional Fourier pattern provided as a stamping structure in addition offers the advantage that it can be captured by means of conventional mobile terminals and read out by means of suitable software. For the capture, the camera of a commercially available smartphone is sufficient here. This is to be attributed to the fact that only the binarized two-dimensional Fourier pattern is captured by the camera as a normal picture. Unlike for example when computer-generated holograms are read out, no light diffracted directly by the Fourier pattern is thus captured. In the case of computer-generated holograms (CGHs) it is namely necessary to read these out by means of a monochromatic laser through diffraction on the hologram structures. For this, the lateral structures of the CGH need to be in the order of magnitude of the wavelength of the light used, since otherwise the light is not effectively diffracted. For example, the structures of a CGH substantially need to have a size of from 500 nm up to 10 µm. This corresponds to an effective resolution of from 50,000 dpi up to 2500 dpi. In contrast with the structures of CGHs, lower resolutions are present in the case of the binarized two-dimensional Fourier pattern. An effective resolution of the binarized two-dimensional Fourier pattern is preferably at most 2500 dpi, preferably at most 1200 dpi, particularly preferably at most 900 dpi. The lower resolutions are necessary in order that the structures can actually also be captured by commercially available cameras by means of normal imaging. An effective resolution of the binarized two-dimensional Fourier pattern of 650 dpi is usually used for the recognition with a commercially available camera. Although the binarized two-dimensional Fourier pattern with a resolution of 650 dpi could be generated by a printer/scanner with a scan or print resolutions of at least 650 dpi, the copy generated would then not be optically variable.

It is furthermore preferably provided that the binarized two-dimensional Fourier pattern is molded with an effective resolution of at most 2500 dpi, preferably at most 1200 dpi, particularly preferably at most 900 dpi.

Further advantageous designs of the invention are described in the dependent claims.

Since the multilayer body can be designed as a laminating film, transfer film, in particular hot-stamping film or cold-stamping film, the multilayer body can be used for a variety of intended uses. For example, the multilayer body is used in the packaging industry for decorating packaging so as to be protected against forgery. However, the multilayer body can also be used to protect security documents, such as for example identity cards, passports, etc., or else also securities. In addition, the multilayer body is used wherever a product is to be authenticated with respect to its authenticity. This is because the authenticity of the product can be checked by means of an authentication server through the machine-readable binarized two-dimensional Fourier pattern, in which a first graphic code is again embedded.

By packaging is meant here a general term which relates to both the sales packaging of a product, for example a toothpaste tube, and the outer packaging, for example the folded box of the product. The packaging can also be a part of an item of packaging, for example a label which is stuck onto an item of outer packaging. An item of packaging can also be a box or the like, in which several items of outer packaging of the product are packaged.

In the present case, by transparent is meant in particular a region with a transmissivity in the wavelength range of the light visible for the human observer of more than 50%, preferably of more than 70%, particularly preferably of more than 80%.

In the present case, by opaque is meant in particular a region with a transmissivity in the wavelength range of the light visible for the human observer of less than 40%, preferably of less than 30%, particularly preferably of less than 20%.

Firstly, the generation of the Fourier pattern will be described in more detail below.

The machine-readable first graphic code is embedded in a real amplitude function of a two-dimensional, discrete complex function G(fx,fy) with an fx frequency coordinate and an fy frequency coordinate. For the embedding, therefore, the code is positioned in a two-dimensional, preferably square, image template, wherein the x and y values of the image template are interpreted as fx and fy frequencies.

In principle, complex numbers or complex functions can be represented as the sum of the real part and the imaginary part or the sum of a real function and an imaginary function, or in polar coordinate notation as the product of an amplitude function and a phase function.

The method according to the invention starts by providing the machine-readable first graphic code as an amplitude function of a two-dimensional discrete complex function G(fx,fy). The amplitude function preferably has either the function value 0 or the function value 1 over the two frequency coordinates fx and fy. The function value 1 is represented in particular by black coordinate points of the code positioned in the image template and the function value 0 is represented in particular by white coordinate points of the code positioned in the image template. Here, the highest frequency used in the fx or in the fy direction is preferably at least 600 dpi.

A suitable phase function $e^{i\varphi}$(fx, fy) is preferably added to the real amplitude function by multiplication.

The phase function has the object of smoothing the frequency spectrum of the amplitude function.

The phase function $e^{i\varphi}$(fx, fy) can be a random phase. The first graphic code for generating the phase function is preferably first formed as a random grayscale image. The outlines of the grayscale image correspond to the first graphic code, except that the values are not 0 (white) and 1 (black) as in the construction of the amplitude function, but rather are random grayscale values between white and black. An allocation of the grayscale values to numbers between 0 and $2\pi$ takes place. The phase is $2\pi$ if the grayscale value is black and the phase is 0 if the grayscale value is white. The other grayscale values are allocated to an angle between 0 and $2\pi$ (radian measure) depending on the grayscale. The blacker, i.e. darker, the color is, the larger the angle is. In this way, the random grayscale image can be uniquely converted into a phase function $e^{i\varphi}$(fx, fy), and the complex-valued function G(fx,fy) is found by multiplying the amplitude function by the phase function. The random phase furthermore offers the advantage that a random phase is allocated to each frequency range, whereby the later Fourier pattern becomes easier to read out.

However, other phase functions can also be added to the real amplitude function.

The two-dimensional discrete complex function G(fx,fy) is then Fourier-transformed, and the resultant Fourier transform g(x,y) is binarized to form a two-dimensional image. For the binarization, the real part of the Fourier transform g(x,y) can be ascertained and binarized by means of a threshold value. The real part of the Fourier transform again contains grayscales. Binarization of an image means here that the value 1 is allocated to each pixel of the image the grayscale of which lies above the threshold value and the value 0 is allocated to each pixel the grayscale of which lies below the threshold value. 10% binarization then means that 10% of the pixels are black and 90% of the pixels are white. 50% binarization then means that 50% of the pixels are black and 50% of the pixels are white etc. Alternatively, the imaginary part or the phase of the Fourier transform g(x,y) can also be ascertained and binarized by means of a threshold value. Further binarization possibilities are known from the state of the art (Goodman, J. W., Introduction to Fourier Optics, McGraw-Hill (New York) (1996)).

The real part of the Fourier transform is preferably binarized and the binarized two-dimensional Fourier pattern is formed by it.

The binarized two-dimensional Fourier pattern is preferably generated with a binarization of less than 50%, preferably less than 20%. The binarization is usually approximately 15%.

The carrier layer consists in particular of a self-supporting material and/or of the plastics class of substances. The carrier layer is preferably selected individually or combined, as a composite material, from the substance classes: PET; polyolefin, in particular from OPP, BOPP, MOPP, PP, PE; PMMA; PEN; PA; ABS. It is also possible for the carrier layer to have already been pre-coated by the manufacturer and for the multilayer body to be built up on this pre-coated material. It is also possible for the carrier layer to be a bio-degradable and/or compostable carrier layer. EVOH is preferably used here.

The layer thickness of the carrier layer advantageously lies between 4 μm and 500 μm, in particular between 4.7 μm and 250 μm.

The multilayer body can be formed as a laminating film which has a carrier layer and a multilayer wear layer, for example a multilayer decorative ply, as well as an in particular heat-activatable adhesive layer, wherein carrier layer and wear layer are arranged together in the form of a stamping layer on a target substrate.

In particular, the multilayer body is formed as a transfer film. A transfer film has in particular a transfer ply which is preferably formed of several layers, wherein the layers are selected in particular individually or multiply or in combination from: adhesive layer, adhesion-promoter layer, primer layer, barrier layer, compensation layer, metal layer, oxide layer, color layer, replication layer, protective layer.

The transfer film furthermore has a carrier layer, wherein the transfer ply is detachable from the carrier layer. To make it easier to detach the transfer ply, a detachment layer can be arranged between the transfer ply and the carrier layer.

It is preferably provided that a detachment layer and/or a protective layer are applied to the carrier layer, in particular wherein the detachment layer and/or the protective layer are arranged between the carrier layer and the replication layer.

The detachment layer ensures in particular that the layers of the multilayer body can, as transfer plies, be separated from the carrier layer non-destructively. The detachment layer is preferably formed of waxes, polyethylene (PE), polypropylene (PP), cellulose derivatives and/or poly(organo)siloxanes. The above-named waxes can be natural waxes, synthetic waxes or combinations thereof. The above-named waxes are, for example, carnauba waxes. The above-named cellulose derivatives are, for example, cellulose acetate (CA), cellulose nitrate (CN), cellulose acetate butyrate (CAB) or mixtures thereof. The above-named poly (organo)siloxanes are, for example, silicone binders, polysiloxane binders or mixtures thereof. The detachment layer preferably has a layer thickness of between 1 nm and 500 nm, in particular a layer thickness of between 5 nm and 250 nm, in particular preferably between 10 nm and 250 nm.

When the multilayer body is used as a laminating film, e.g. for label and/or sticker applications, the connection between carrier layer and subsequent layers or wear layer(s) is as a rule preserved during application. In the case of laminating films, in principle a detachment layer is therefore dispensed with, or it is designed, e.g. in the case of laminating films for security applications, such that a separation of the carrier layer from the wear layers can preferably only occur after the application.

The detachment layer can be produced with the known printing methods. In particular, gravure printing, flexographic printing, screen printing, inkjet printing or application by means of a slot die is suitable. However, the detachment layer can also be formed by vapor deposition, physical vapor deposition (PVD), chemical vapor deposition (CVD) and/or sputter deposition.

The protective layer is preferably a thermoplastic layer or a thermally curing layer or a radiation-curing layer of a varnish, selected individually, in several partial layers and/or as a mixture from: PMMA, PVC, melamines, acrylates, polyurethanes, crosslinkers, photoinitiators, additives, antifoaming agents, leveling agents, wetting agents. The protective layer can also consist of a radiation-curing dual-cure varnish. This dual-cure varnish can be thermally pre-crosslinked in a first step during and/or after application in liquid form. Preferably, in a second step, in particular after the processing of the multilayer film, the dual-cure varnish is radically post-crosslinked, in particular via high-energy radiation, preferably UV radiation. Dual-cure varnishes of this type can consist of different polymers or oligomers, which have unsaturated acrylate or methacrylate groups. These functional groups can, in particular in the second step, be radically crosslinked with each other. For the thermal pre-crosslinking in the first step it is advantageous that at least two or more alcohol groups are also present in the case of these polymers or oligomers. These alcohol groups can be crosslinked with multifunctional isocyanates or melamine formaldehyde resins. Different UV raw materials such as epoxy acrylates, polyether acrylates, polyester acrylates and in particular acrylate acrylates preferably come into consideration as unsaturated oligomers or polymers. Both blocked and unblocked representatives based on TDI (TDI=toluene-2,4-diisocyanate), HDI (HDI=hexamethylene diisocyanate) or IPDI (IPDI=isophorone diisocyanate) can come into consideration as isocyanate. The melamine crosslinkers can be fully etherified versions, can be imino types or represent benzoguanamine representatives.

The protective layer preferably has a layer thickness of between 50 nm and 30 μm, preferably between 1 μm and 3 μm. The protective layer can be produced by means of gravure printing, flexographic printing, screen printing, inkjet printing, by means of a slot die and/or by means of vapor deposition, in particular by means of physical vapor deposition (PVD), chemical vapor deposition (CVD) and/or sputter deposition. The vapor deposition is effected in particular in the case of thinner protective layers under 1 μm.

In particular, it is possible for a metal layer and/or an HRI layer and/or a primer layer and/or an adhesive layer to be applied to the replication layer partially or over the whole surface, preferably after curing of the replication varnish. It is furthermore also possible for a metal layer and/or an HRI layer and/or a primer layer and/or an adhesive layer to be arranged on the replication layer.

The metal layer can be applied both over the whole surface and in regions. The metal layer can preferably be formed patterned and represent a pattern and/or a motif, which can in particular also be arranged in register with a print and/or with the stamping structures of the replication layer. It can furthermore also be possible for the metal layer to be arranged in the first region at least partially or over the whole surface. As described above, the stamping structure of the binarized two-dimensional Fourier pattern is at least partially provided in a first region. Because the metal layer is likewise provided in the first region, it is ensured that the binarized two-dimensional Fourier pattern is metallized and thus obtains a metallic appearance.

It is preferably also provided that the metal layer is formed in register with the stamping structure.

By registered or register or registration-accurately or register-accurately or registration accuracy or register accuracy is meant a positional accuracy of two or more layers relative to each other. The register accuracy is to range within a predefined tolerance which is to be as small as possible. At the same time, the register accuracy of several elements and/or layers relative to each other is an important feature in order to increase the process reliability and/or the product quality and/or the protection against forgery. The positionally accurate positioning can in particular be effected by means of sensorily, preferably optically, detectable registration marks or register marks. These registration marks or register marks can either represent specific separate elements or regions or layers or themselves be part of the elements or regions or layers to be positioned.

The metal layer is preferably formed individually or as an alloy or as a eutectic, selected from: aluminum, chromium, gold, copper, tin, indium, silver. The metal layer is preferably produced by means of vapor deposition, in particular by means of vacuum vapor deposition. The vapor-deposited metal layer can be effected over the whole surface and optionally preserved over the whole surface or else be structured with known demetallization methods such as etching, lift-off (washing varnish method) or photolithography and thereby be only partially present then. The layer thickness of the metal layer lies in particular between 10 nm and 500 nm.

However, the metal layer can also consist of a printed layer, in particular of a printed layer of metal pigments in a binder. These printed metal pigments can be applied over the whole surface or partially and/or have different colorings in different regions of surface. The layer thickness of the metal layer of metal pigments lies in particular between 1 μm and 10 μm.

It is also possible to produce the metal layer from a varnish with electrically conductive metallic pigments, in particular to print and/or pour it on.

Alternatively, instead of the metal layer, an HRI or LRI layer (high refractive index—HRI, low refractive index—LRI) can also be used. Such a dielectric HRI or LRI layer consists, for example, of a vapor-deposited layer of a metal oxide, metal sulfide, titanium oxide etc. The layer thickness of such a layer is preferably 10 nm to 500 nm.

Further, it is also possible to provide a first metal layer in a semi-transparent design as an optical filter layer. Such a metal layer consists, for example, of a vapor-deposited layer of thin metal (Al, Cr), or a thinly applied metal oxide, metal sulfide, silicon oxide etc. The layer thickness of such a layer is chosen such that the optical density lies in a range in particular of from 0.1 to 0.9 OD (OD=optical density). The subsequent dielectric spacer layer required for a thin-film color-tilt effect can be coated analogously to the replication layer, wherein the layer thickness range preferably lies between 0.1 μm and 1.0 μm and/or the composition corresponds in particular to the replication layer. In this case, the spacer layer can also serve directly as a replication layer. The spacer layer can also be vapor-deposited as a ceramic spacer layer. Typically, metal or semi-metal oxides such as e.g. $SiO_2$, $TiO_2$, $Na_3AlF_6$ or $MgF_2$ are then vapor-deposited here according to one of the methods also named for the metal layer. The layer thicknesses here lie in particular between 20 nm and 500 nm. The spacer layer can also be printed on as a transparent varnish layer.

This optical filter layer can also already be applied before the replication layer. The replication layer then serves in particular as a dielectric spacer layer, wherein the layer thickness range preferably lies between 0.1 μm and 1.0 μm.

Adjoining the dielectric spacer layer, an opaque or semi-transparent metal layer is then vapor-deposited in particular as described above.

The adhesive layer and/or the primer layer is preferably formed of a varnish, selected individually, in several partial layers and/or as a mixture from: PMMA, PVC, acrylates, polyamide, polyvinyl acetates, hydrocarbon resins, polyesters, polyurethanes, chlorinated polyolefins, polypropylenes, epoxy resins, polyurethane polyols, in particular in combination with inactivated isocyanates, fillers, for example $SiO_2$ and/or $TiO_2$. A primer layer can also be provided in addition to an adhesive layer.

The layer thickness of the adhesive layer and/or of the primer layer is preferably between 0.5 μm and 20 μm, particularly preferably between 1.5 μm and 5 μm. The adhesive layer and/or the primer layer can be produced by means of gravure printing, flexographic printing, screen printing, inkjet printing and/or application by means of a slot die.

The replication layer preferably has the binarized two-dimensional Fourier pattern as a stamping structure on one of its upper sides, at least in regions. The replication layer is preferably formed of a thermoplastic varnish or of a radiation-curing varnish, selected individually, in several partial layers and/or as a mixture from acrylate, cellulose, PMMA, polyurethanes, isocyanates. A surface structure is molded in particular into thermoplastic replication layers preferably by means of heat and pressure through the action of a stamping tool.

Further, it is also possible for the replication layer to have a UV-curable replication varnish, which is precured or completely cured by means of UV radiation after molding of the stamping structure. The stamping structure is molded into the not yet finally cured replication layer through the action of a stamping tool and the replication layer is cured by irradiation with UV light directly during or after the molding. An additional irradiation with UV light can be effected before and/or during the molding.

In principle, the replication layer can be produced by means of the known printing methods. In particular, gravure printing, flexographic printing, screen printing or inkjet printing is suitable. However, production by means of a slot die is also possible.

It is preferably provided that the binarized two-dimensional Fourier pattern is provided as nanostructures and/or as microstructures, in particular is provided as diffractive gratings, scattering matte structures, reflective facets and/or reflective microstructures. Furthermore, it is possible for the binarized two-dimensional Fourier pattern to be molded into the replication layer as nanostructures and/or microstructures, in particular to be molded into the replication layer as diffractive gratings, scattering matte structures, reflective facets and/or reflective microstructures.

As already described further above with regard to the generation of the Fourier pattern, the binarized two-dimensional Fourier pattern is preferably formed of light pixels and dark pixels. These light pixels and dark pixels are preferably arranged within a two-dimensional grid with a resolution of M×N pixels.

It has been shown that commercially available printers have a print resolution of approximately 600 dpi, with the result that when the binarized two-dimensional Fourier pattern is photographed and the photographed binarized two-dimensional Fourier pattern is printed out again so much information is lost that a reconstruction of the first graphic code is no longer possible. If the binarized two-dimensional Fourier pattern is to be copied and the information contained therein is to be preserved, then at least the effective resolution of the binarized two-dimensional Fourier pattern must be preserved during the copying process. If for example during the copying process either the scanner used or the printer used have a lower resolution than the effective resolution of the binarized two-dimensional Fourier pattern, the binarized two-dimensional Fourier pattern is only incompletely transferred, and the first graphic code contained therein is damaged and as a result is no longer readable. It has been shown that a protection against copying using commercially available office copiers is guaranteed in the case of the above-named pixel sizes. Because the binarized two-dimensional Fourier pattern is designed as a stamping structure, however, the optical variability of the binarized two-dimensional Fourier pattern due to the stamping structure cannot be imitated by copiers, whereby the protection against forgery is further increased.

The effective resolution is preferably the resolution that the binarized two-dimensional Fourier pattern has. The effective equivalent resolution is preferably the resolution that the binarized two-dimensional Fourier pattern introduced into the stamping structure has.

The effective equivalent resolution of the binarized two-dimensional Fourier pattern introduced into the stamping structure is determined by the positioning of the first graphic code within the image template, which is done before the Fourier transformation. The horizontal and the vertical axes of the image template are interpreted here as (spatial) frequency axes. The frequency 0 is located in the center of the image template and the highest frequencies fx_limit or fy_limit achievable in the stamping process are located at the edges of the image template. The positioning of the first graphic code within the image template in the fx and fy direction establishes the greatest horizontal spacing fx_max of the first graphic code from the image center as well as the greatest vertical spacing fy_max of the first graphic code from the image center. Quotients fx_max/fx_limit and fy_max/fy_limit are found. The effective resolution in the x direction is the product of the quotient fx_max/fx_limit multiplied by the resolution used of the stamping process $$resolution_{eff,x} = \frac{fx_{max}}{fx_{limit}} \cdot resolution$$

and the effective resolution in the y direction is the product of the quotient fy_max/fy_limit multiplied by the resolution used of the stamping process $$resolution_{eff,y} = \frac{fy_{max}}{fy_{limit}} \cdot resolution.$$

The maximum effective resolution is the greater value of the effective resolution in the x direction and effective resolution in the y direction. The first graphic code is preferably positioned so far outside the image template that the values fx_max or fy_max are so large that the maximum effective equivalent resolution lies above 600 dpi. If the first graphic code is positioned for example precisely up to the edge of the image template, then the maximum effective equivalent resolution corresponds precisely to the resolution used of the stamping process. If the first graphic code is positioned for example up to halfway between the center and the edge of the image template, then the maximum effective equivalent resolution corresponds precisely to half the resolution used of the stamping process.

At the same time it is preferred that the maximum effective equivalent resolution is at most as great as the typical resolution of a camera of an authentication system. In particular in the case of mobile authentication systems, the maximum effective equivalent resolution should lie below 1200 dpi.

In particular it is possible for the light pixels and dark pixels to be formed of diffractive gratings, wherein the gratings of the light pixels and the dark pixels differ by the grating period and/or grating depth and/or orientation. The gratings can be linear or crossed or serpentine gratings or can also comprise more complex variants. The profile shape can be sinusoidal, blazed or more complex.

Further, it can be possible for the grating period of the diffractive gratings to lie in a range of from 200 nm to 20 µm, preferably from 250 nm to 10 µm, and/or for the grating depth of the diffractive gratings to lie in a range of from 50 nm to 2 µm and/or for the grating depth of the diffractive gratings to be 5% to 20% of the grating period.

If the contrast between the diffractive gratings of the light pixels and dark pixels is generated by a different grating period, then this difference in the period is preferably at least 20 nm and further preferably at least 50 nm and in particular preferably at least 100 nm.

In an embodiment the gratings are sinusoidal linear or serpentine gratings in which the orientation of the grating lines in the light pixels and dark pixels differs by at least 30°, preferably more than 45°, further preferably at least 60° and in particular by almost 90°.

Alternatively, it can also be provided that the light pixels and dark pixels are formed by a structures appearing light or dark in direct reflection, wherein the structures appearing dark comprise high-frequency and deep crossed grating structures and/or crossed gratings and/or hexagonal gratings and/or mirrors, and/or wherein the structures appearing light comprise static and/or dynamic matte structures and/or Fourier holograms. The structure appearing dark can appear color-neutral here, thus dark gray to black, or can also appear dark-colored, such as for example dark red. The structure appearing light can likewise appear color-neutral, thus light gray to white, e.g. gold-colored.

The structures appearing dark are preferably formed of mirrors or high-frequency and deep crossed grating structures, also known as subwavelength gratings. It is preferably possible for the grating period of the crossed gratings and/or hexagonal gratings to lie in a range of from 200 nm to 450 nm and for the grating depth of the crossed gratings and/or hexagonal gratings to be more than 150 nm. Crossed gratings and/or hexagonal grating offer the advantage that they display stronger color impressions compared with linear gratings. This is advantageous in particular when the binarized two-dimensional Fourier pattern is to be designed colored.

In addition, it is preferably provided that the average spacing of the matte structures lies in a range of from 500 nm to 5 µm and the average depth of the matte structures lies in a range of from 100 nm to 2 µm.

Alternatively, it is also conceivable that the light pixels and dark pixels are formed by blazed gratings, wherein the orientation of the blazed grating in the light pixels and the dark pixels differs by at least 150° and is in particular approx. 180°. It is preferably provided that the grating period of the blazed gratings lies in a range of from 3 µm to 20 µm and/or the grating depth of the blazed gratings lies in a range of from 500 nm to 2 µm. A white appearance is thereby generated and in addition such blazed gratings can be replicated well thermally.

To compensate for surface roughnesses of the target substrate, the multilayer body can also comprise at least one compensation layer, which is preferably arranged between the replication layer and the adhesive layer or primer layer or between the metal layer and the adhesive layer or primer layer. Such a compensation layer is used in particular when the multilayer body or the transfer ply of the multilayer body is applied to a target substrate with a comparatively high surface roughness, for example uncoated cardboard or uncoated paper. Due to the compensation layer, the capture and reading-out of the binarized two-dimensional Fourier pattern by means of a mobile terminal is then improved. It is also possible to provide several compensation layers, in particular between different layers of the transfer ply. For example between the adhesive layer and the primer layer.

The compensation layer can be produced by means of gravure printing, flexographic printing, screen printing, ink-jet printing, by means of a slot die and/or by means of vapor deposition, in particular by means of physical vapor deposition (PVD), chemical vapor deposition (CVD) and/or sputter deposition.

The compensation layer preferably has a layer thickness in the range of from 5 µm to 20 µm.

The compensation layer can in particular contain materials selected individually or in combination from: acrylates, polyurethanes, nitrocellulose, fillers, additives.

If the multilayer body is a hot-stamping film, then the compensation for surface roughnesses can preferably also be effected by a smoothing pre-printing on the substrate. This is advantageous particularly when the target substrate is a paper or a cardboard. Due to the pre-printing on the substrate, a so-called coated paper or a coated cardboard is obtained. The pre-printing on the substrate is preferably a depositing of a binder which smooths the surface of the paper or cardboard. The binder preferably comprises one or more components selected from: chalk, kaolin, calcium carbonate. The binder is preferably applied to the paper or the cardboard uniformly and over the whole surface by means of a doctor blade, and thus seals the surface. Where appropriate, the cardboard or the paper can then also be guided through a calender, during which the surface of the cardboard or the paper is smoothed and calendered with the aid of rollers under the action of heat and pressure. Due to the smoothed surface of the target substrate, the binarized two-dimensional Fourier pattern appears more intense after application of the multilayer body or a transfer ply of the multilayer body, whereby it is easier for a mobile terminal to capture even in the case of poor illumination qualities.

Alternatively, when the multilayer body is used as a hot-stamping film for the target substrate, in particular uncoated cardboard or uncoated paper, it can be provided to coat the surface of the target substrate with waterglass. Waterglass denotes glass-like, amorphous, water-soluble sodium, potassium and/or lithium silicates solidified from a melt or aqueous solutions thereof. In order to be able to apply the solid waterglass to a paper or a cardboard, it is first ground to a powder. From this, by being dissolved in water at high temperatures, in particular in a range of from 100° C. to 200° C., and at high pressures, in particular in a range of from 1 bar to 8 bar, liquid waterglass (so-called liquid glass) is obtained as a clear colloidal alkaline solution or also as an alkaline gel. This solution or this gel can then be applied to the paper or the cardboard for coating. After a predetermined drying time, the target substrate has a smooth surface. Here too, the binarized two-dimensional Fourier pattern appears more intense, and is thus easier for a mobile terminal to capture, after application of the multilayer body or a transfer ply of the multilayer body.

When the multilayer body is used as a cold-stamping film, a comparatively thick adhesive layer can be used to compensate for surface roughnesses. During the cold stamping, the adhesive layer is first applied immediately before application either to the underside of the multilayer body or to the upper side of the target substrate. A cold glue, in particular a UV-curing cold glue, is preferably used for this. The cold glue is preferably applied to the target substrate and/or to the multilayer body with an application weight in the range of from 5 g/m² to 6 g/m².

It is furthermore also possible, when the multilayer body is used as a cold-stamping film, for a substrate pre-printing onto the target substrate to be effected before application of the multilayer body or the transfer ply of the multilayer body. With respect to the specifications of the substrate pre-printing, reference may be made to the above statements, which apply equally here.

It is preferably provided that the first graphic code is a machine-readable code, in particular a 2D barcode, a QR code or a data matrix code. It is further possible for the first graphic code to be a batch-specific code, in particular for a batch number to be provided when the first graphic code is read out.

For this, a series of multilayer bodies is preferably first divided into preferably disjoint batches. A batch-specific batch number is allocated to each multilayer body of a batch. Within a batch and within a master, several serial numbers can be used by equipping the stamping cylinder and/or the stamping tool with different unique serial numbers.

It is therefore provided in particular that the multilayer body has a second graphic code. It is preferred that the second graphic code is a unique code, in particular an item-unique or a series-unique code, particularly preferably that a serial number is provided when the second graphic code is read out. The second graphic code is preferably openly readable. By openly readable is meant that it is applied to the multilayer body such that it is captured with a conventional read algorithm which has been downloaded onto a commercially available mobile terminal, e.g. smartphone, which has a camera and the information contained in it, for example the serial number, can be read out. Openly readable can also be meant that the meaning of the second graphic code can be understood by a person without aids. This can be, for example, a date specification or a continuous serial number or item numbering.

The batch number, like the serial number, can be a sequence of numbers, a sequence of letters, a sequence of characters or combinations of the above-named characters. The batch and serial numbers are an item of information by which the batch or the individual multilayer body can be identified. It can also be a two-dimensional arrangement of characters or images.

The batch-specific batch numbers are encoded in machine-readable batch-specific first graphic codes. The unique serial numbers are encoded in unique machine-readable second graphic codes. The first graphic codes and/or the second graphic codes are preferably conventional machine-readable codes such as 2D barcodes, in particular data matrix codes or QR codes. They can also be one-dimensional barcodes, but also Trillcodes, QuickMark codes, ShotCodes etc. The machine-readable graphic codes generally comprise optoelectronically readable symbols, which consist of lines or dots with different widths and of gaps in between them with as high as possible a contrast.

However, it is also possible for a URL of an authentication server to be stored in the second graphic code. With this URL, a user can connect to an authentication server. Such a URL could be for example https://www.authserver.com/, the serial number is preferably part of the URL, for example https://www.authserver.com/serialnumber/12345, wherein 12345 is the serial number. Thus, a consumer can connect to the authentication server via an internet browser by scanning the machine-readable second graphic code with a smartphone.

In particular, it is provided that the first graphic code, in particular the batch number, and/or the second graphic code, in particular the serial number, are stored in an authentication database of an authentication server, in particular are stored in pairs in an authentication database of an authentication server.

It is preferably provided that the binarized two-dimensional Fourier pattern and/or the second graphic code are captured with a mobile terminal and a data-carrying connection is produced between the mobile terminal and the authentication server and a piece of authentication software makes it possible to compare the data captured by the mobile terminal and transmitted to the authentication server and the read-out first graphic codes stored in the authentication database, in particular the batch number, and/or the read-out second graphic code, in particular the serial number.

It is particularly preferred that the second graphic code is applied in the form of a print in front of the replication layer by applying the print to the carrier layer and/or to a detachment layer and/or to a protective layer at least partially in a second region, and/or that the second graphic code is applied in the form of a print behind the replication layer by applying the print to the replication layer and/or a metal layer and/or an HRI layer and/or an adhesive layer and/or a primer layer at least partially in a second region.

The two arrangements make different optical effects possible. For example, when observed from the carrier layer, in the case of a printing after the structuring replication step, a stamping structure can be superimposed on the print. This is not possible when observed from the carrier layer if the printing is already carried out before the structuring replication step. In the case of applications in which the multilayer body is observed both from the carrier layer and from the side facing away from the carrier layer, in particular in a window or a transparent substrate region, the targeted positioning of the print or of the prints in front of or, observed from the carrier layer, behind a replication layer, thus makes different visual effects on the observation side possible.

The two arrangements named above preferably offer the advantage that the print is protected both against external mechanical influences and against manipulation attempts.

In this printing method step, an open machine-readable second graphic code is preferably printed on the multilayer body with a preferably lower resolution with a digital printing method. The machine-readable graphic code can contain at least one unique serial number as information. By unique serial number is meant that the number is used only once in the series of multilayer bodies, and is thus unique. The serial number is preferably chosen from a large number range or generated cryptographically, with the result that potential forgers are not able to guess a valid serial number.

It can be possible for the printing to be effected by means of a digital printing method and to be chosen from the group inkjet printing, thermal transfer printing, laser printing, laser engraving.

It is also conceivable that the print or the ink is applied to a substantially smooth surface of the replication layer, in particular to a not yet replicated replication layer. Here, the surface is preferably replicated at least in regions at a later point in time.

The ink can be formed transparent, translucent, opaque, invisible, colored and/or colorless. Likewise, in principle, the print is not limited to any specific design. The print can be formed transparent, translucent, opaque, invisible, colored and/or colorless.

Furthermore, the provision of luminescent ink, both transparent and colored luminescent ink, fluorescent ink, both transparent and colored fluorescent ink, phosphorescent including chemiluminescent ink, both transparent and colored phosphorescent ink, and/or liquid crystalline inks, in particular with dichroic color effects and/or laser-sensitive inks and/or inks with taggants, whereby the addition of an additional machine-readability can be achieved, is also conceivable.

Both light-curing, in particular UV-curing, inks and solvent and/or aqueous inks can be used.

If a print is applied to an already replicated replication layer, then the corresponding replicated structure is preferably weakened at this point. In the case of suitable printing varnishes and layer thicknesses of the printed layer the replicated structure can even be erased or almost erased, whereby the optical effect of the structure is destroyed locally. The surface of the printed layer, which forms towards the air during the printing process, is preferably smooth or also isotropically matte after the drying of the printed layer. If a transparent print is thus preferably applied, then neither the structure nor the print itself is visible or they are almost invisible at this point. If a non-transparent print is preferably applied, then the structure is no longer visible at this point. The print appears in the corresponding coloring. The regions with the erased structures preferably appear as mirror surfaces or matte surfaces for an observer and/or sensor after a metal layer has been applied to the replication layer.

The thickness of the applied or printed ink layer preferably lies between 0.1 μm and 30 μm, in particular between 0.5 μm and 15 μm, particularly preferably between 0.5 μm and 15 μm and advantageously between 1 μm and 8 μm. If solvent and/or aqueous inks are used, the layer thickness is then preferably approximately 0.5 μm. If UV-curing inks are used, the layer thickness is then approximately between 1 μm and 30 μm, preferably between 1 μm and 15 μm, particularly preferably between 1 μm and 8 μm.

It is furthermore also possible for the replication layer to be replicated together with the print applied thereto.

It is further also possible for the print to contain an ink, preferably UV-curable ink, and/or for the print to be overmolded, coated over and/or encapsulated by a UV-curing replication varnish, whereby in particular an initial crosslinking and/or a crosslinking takes place. An initial crosslinking is an incomplete, only partial crosslinking. In particular, in addition to the surface crosslinking, the through-cure of the UV-curable ink can also be improved through the overmolding and/or encapsulation with the UV-curing replication varnish because, through the crosslinking in particular of thin UV-curable layers, disruptive inhibition effects, for example due to atmospheric oxygen, can be prevented. In particular, this can be particularly advantageous in the case of UV-curable inks applied thinner than approx. 1.5 μm since, with decreasing layer thickness of the UV-curable ink, inhibition effects have a stronger impact or can even prevent a surface and layer crosslinking to the extent that the print or the ink can remain sticky and e.g. a multilayer body that has been printed on cannot be wound up as a roll.

To cure thin UV-curing layers, as a rule complex and expensive inertization measures are necessary during the UV curing, in particular during the UV curing under protective gases such as argon or nitrogen. If the printing with the UV-curing ink is carried out without winding up the multilayer body in the same manufacturing step as the UV replication, these complex and expensive measures can be avoided by overlaying the UV-curable print with the UV-curing replication varnish downstream.

In addition, the UV drying process used during the UV replication represents an additional post-curing for the UV print that is effective because of the minimization of the inhibition. In particular, after an optional pinning (UV precure), the UV-curing equipment of the UV replication can also be used during application of the UV print, without additional UV-curing equipment being necessary for curing the print itself.

In particular, combining the printing of the UV-curing ink with a UV replication process directly downstream can lead to UV inks being able to be applied very much thinner than would actually be possible without complex measures determined by curing.

In particular, the "initial crosslinking" of the UV-curing ink or of the UV-curing print onto the surrounding matrix of the UV replication varnish leads to the print being materially inseparably joined to the polymeric surroundings. The print then advantageously no longer represents a discrete layer on its own. This additionally makes manipulation more difficult.

In particular, it is advantageous if, through the UV curing of the UV-curing replication varnish, there is the possibility of post-crosslinking of the UV-curable ink, which can lead to higher stabilities of the UV-curing ink.

It is furthermore advantageous for an application of UV replication to a print, in particular independently of the material composition of the print, that mechanical and/or thermal stresses on the print, in particular due to contact pressures or above all due to temperatures, such as occur during thermal replication, are significantly reduced.

Furthermore, it is also possible for the print to be applied to an already replicated surface of the replication layer. This means that the replication layer has already been provided with a stamping structure. The ink is preferably applied to the structured surface or to the stamping structure at least in regions. The depositing of the print is preferably effected in register with the stamping structure. Ideally, the ink is applied such that the ink only partially fills the stamping structures. A partial filling of the structures occurs in particular when the finally applied ink layer thickness is less than the depth of the stamping structures of the binarized two-dimensional Fourier pattern. The ink can furthermore also be applied over part of the surface in a grid such that the ink only covers a part of the surface area of the stamping structures. The resolution of the grid preferably lies below the resolving power of the human eye, wherein neighboring grid elements of the ink preferably have a mutual spacing which lies in a range of from 5 μm to 250 μm, preferably from 20 μm to 200 μm, and/or wherein a line width and/or a dot diameter and/or an individual element diameter grid elements lies in a range of from 5 μm to 250 μm, preferably from 20 μm to 200 μm.

Under specific conditions the ink can also completely fill in the stamping structures of the binarized two-dimensional Fourier pattern without them being optically erased. This is the case in particular when the ink has reflective or highly refractive properties and differs in its complex refractive index in particular by more than 0.2 from the complex refractive index of the replication layer. An example of reflective inks are inks with metal effect pigments or metal flakes. An example of highly refractive inks are inks based on liquid crystals. For a partial filling, in particular macroscopic structures, i.e. in particular non-diffractive effective structures, are also suitable in a replication layer. Because the stamping structure of the binarized two-dimensional Fourier pattern is not optically erased by the print, it is ensured that all items of information in the Fourier pattern are preserved and they can always be captured and evaluated by means of a mobile terminal when the Fourier pattern is read out.

It is preferably provided that the first region and the second region are arranged adjoining each other or spaced apart from each other or overlapping each other at least in regions. Because the binarized two-dimensional Fourier pattern is arranged in the first region and the second graphic code is arranged by means of printing in the second region, a variety of creative designs are conceivable.

For example, the binarized two-dimensional Fourier pattern can be arranged spaced apart from the second graphic code. Ideally, however, the spacing should be chosen such that both the binarized two-dimensional Fourier pattern and the second graphic code can always be captured at the same time with a mobile terminal, preferably with one acquisition. For this, the resolution of the camera used is decisive.

Alternatively, the binarized two-dimensional Fourier pattern and the second graphic code can also partially overlap. Thus, the second graphic code can be arranged for example such that one part of the second graphic code is surrounded by the binarized two-dimensional Fourier pattern and another part of the second graphic code is surrounded by another background. For example, all decorative layers, such as for example color layers and/or metal layers and/or printed layers, come into consideration as background here. It can also be possible for the other background itself to represent a further security feature. For example, they can be diffraction structures such as holograms or Kinegram® and/or matte structures and/or blazed gratings and/or computer-generated holograms (CGHs).

It is further also conceivable that the second region is arranged completely in the first region. The second graphic code then lies within the binarized two-dimensional Fourier pattern. As already described above, the print or the ink of the second graphic code is applied such that the print or the ink only partially fills in the stamping structures of the binarized two-dimensional Fourier pattern. All items of information of the Fourier pattern are thereby obtained. Such an arrangement offers the advantage that both the binarized two-dimensional Fourier pattern and the second graphic code can always be captured with one acquisition.

It is furthermore also possible for additional stamping structures to be provided in a third region or in regions in which no binarized two-dimensional Fourier pattern is present. These can be for example structures selected individually or in combination and/or superimposed from: light-diffracting micro- or nanostructure, light-refracting micro- or nanostructure, light-focusing micro- or nanostructure, binary or continuous Fresnel lens, binary or continuous Fresnel freeform surface; diffractive macrostructure, refractive macrostructure, in particular lens structure or microprism structure, mirror surface, matte structure, in particular anisotropic matte structure or isotropic matte structure, computer-generated hologram structures, blazed grating, volume holograms, Kinegram® or the like. This ensures an optically appealing overall impression and/or an additional protection against forgery.

Both a spatial separation of the binarized two-dimensional Fourier pattern and the additional stamping structures and an integration of the binarized two-dimensional Fourier pattern in at least one design element of the additional stamping structures are conceivable. By spatial separation is preferably meant here a spacing between binarized two-dimensional Fourier pattern and the additional stamping structures. By design element is preferably meant here complete motifs and also incomplete motifs, i.e. fragments of motifs. A motif can in particular be selected from or be a combination of: image, symbol, logo, coat of arms, flag, portrait, alphanumeric character. For example, the binarized two-dimensional Fourier pattern can be integrated in a motif in order to generate a particularly high level of protection against forgery of the multilayer body.

Further, it is possible for at least one glazing color layer to be arranged over the whole surface or partially at least in regions or over the whole surface behind the at least one first region and/or second region in the direction of view of an observer. If the glazing color layer is arranged behind the first region, in which the binarized two-dimensional Fourier pattern is arranged, and/or behind the second region, in which the second graphic code is arranged, then the effect of the glazing color layer is preferably visible only at the points at which the binarized two-dimensional Fourier pattern has light pixels and/or the second graphic code has light pixels, in particular white or transparent pixels.

This glazing color layer can directly adjoin the metal layer or be spaced apart from the metal layer by a dielectric intermediate layer. The at least one glazing color layer here acts as a colored background and thus as an optically contrasting region and generates for an observer a capturable color impression in the corresponding coloring of the color layer. In addition, due to the strengthening of the contrast with the background, the capture of the binarized two-dimensional Fourier pattern by means of a mobile terminal is also improved.

It is advantageous if the at least one glazing color layer, in particular in direct reflection over a tilt angle range of from preferably at least 0° to 30° relative to the normal and/or over a tilt angle range of from preferably at least 30° to 60° relative to the normal, in particular in the CIELAB color space, have a total color difference dE of from 50 to 270, preferably from 100 to 270, further preferably from 130 to 270, from the first region and/or from the second region.

It is also advantageous that the at least one glazing color layer, in particular in direct reflection over a tilt angle range of from preferably at least 0° to 30° relative to the normal and/or over a tilt angle range of from preferably at least 30° to 60° relative to the normal, has a lighter color, in particular with a higher lightness value L, and the first region and/or second region, in particular the dark pixels of the first and/or second region, in particular with a lower lightness value L. The color effect of the glazing color layer can thereby act through the light pixels, whereby the contrast of the light with the dark pixels is further strengthened.

For authentication, the authentication method mentioned at the beginning is expediently carried out, which is preferably carried out with an authentication system. The authentication method is suitable for being carried out with one of the above-named multilayer bodies or a series of multilayer bodies which are produced according to one of the above-named production methods.

The authentication method is carried out according to the invention with a mobile terminal which has a camera. The mobile terminal can be a commercially available smartphone and the camera can be a commercially available camera integrated in smartphones.

The image capture by the camera is typically effected as an RGB color image with an image representation in three color channels red ($0 \leq R \leq 255$), green ($0 \leq G \leq 255$) and blue ($0 \leq B \leq 255$). For the evaluation, the color image is converted into a grayscale image, wherein the respective grayscale value of the individual pixel can be determined as the weighted total of the color channels:

$$G = C_R \cdot R + C_G \cdot G + C_B \cdot B$$

The coefficients $C_R$, $C_G$ and $C_B$ can prove to be different depending on the sensor type and the conversion algorithm used.

The combinations $C_R = 1/4$, $C_G = 1/2$ and $C_B = 1/4$ (Baier sensor) or $C_R = C_G = C_B = 1/3$ (HSI model) are preferably used.

By contrast is meant in this connection the value K calculated according to the following formula from the maximum grayscale value $I_{max}$ and the minimum grayscale value $I_{min}$ of the binarized two-dimensional Fourier pattern:

$$K = \frac{I_{max} - I_{min}}{I_{max} + I_{min}}$$

Tests for the read-out behavior have revealed that in an ideal illumination situation a minimum contrast of K=0.05 is needed.

Under real conditions with changing illumination qualities, on the other hand, a minimum contrast of K=0.1 is preferred for a robust read-out process.

It is preferred in particular that the contrast K in the grayscale image of the stamping structures lies in the range of from 0.1 to 0.2. The two limit values are also included in the named range.

The contrast of the binarized two-dimensional Fourier pattern is, as described above, generated via the light pixels and dark pixels formed by the stamping structure.

Due to the generated contrast, a flawless capture of the first graphic code of the multilayer body is possible.

In particular, it is possible for the second graphic code of the multilayer body to also be captured when the image is captured, the captured image is supplied to a second read algorithm for the second graphic code and the second graphic code is read out and the read-out first graphic code and the second read-out graphic code are checked.

Further, it is possible for a batch number to be provided by the reading-out of the first graphic code and a serial number to be provided by the reading-out of the second graphic code, and for the batch number and the serial number to be checked. In the process it is preferably checked whether the batch number and the serial number and their allocation to each other are valid.

Firstly, batch-specific batch numbers and unique serial numbers are allocated to each other in pairs and preferably stored in a database. The serial numbers are advantageously formed not continuously, but cryptographically encrypted, with the result that a forger cannot easily think up or guess a valid serial number.

It is further also possible for the read-out first graphic code, in particular the read-out batch number, to be supplied to an authentication server and to be compared with valid first graphic codes, in particular batch numbers, stored on the authentication server and for the read-out first graphic code, in particular batch number, to be authenticated if it matches one of the stored valid first graphic codes, in particular batch numbers.

Furthermore, it is possible for the read-out second graphic code, in particular the read-out serial number, to be supplied to the authentication server and to be compared with valid second graphic codes, in particular serial numbers, stored on the authentication server and for the read-out second graphic code, in particular serial number, to be authenticated if it matches one of the stored valid second graphic codes, in particular serial numbers.

It is particularly preferably provided that the multilayer body is authenticated if the first graphic code has been authenticated or if both the first graphic code, in particular the batch number, and the second graphic code, in particular the serial number, have been authenticated.

The multilayer body is preferably authenticated if the combination of read-out first graphic code, in particular batch number, and read-out second graphic code, in particular serial number, have been authenticated.

For this, both the serial number and the batch number are stored in a database, wherein the database is connected in a data-carrying manner to the authentication server. The serial number and the batch number are compared with serial numbers and batch numbers stored in the database. If both numbers match on their own and as a pair, the multilayer body is authenticated. It is then an original multilayer body.

If the batch number or the first graphic code cannot be read out, for example because it is a blurred photocopy of the binarized two-dimensional Fourier pattern of the multilayer body, the multilayer body is not authenticated. If the serial number or the second graphic code has already been queried once or multiple times, the serial number or the second graphic code is preferably no longer authenticated in the case of a next query. A serial number or the second graphic code may preferably be queried only once or a specific number of times and is then blocked or invalidated.

All or some of the Fourier back-transformation program necessary for the authentication method, the first read algorithm and/or the second read algorithm can be arranged on the mobile terminal. However, it is also conceivable that one or more of these programs are stored on an authentication server. The database which has stored valid batch number and serial number pairs is preferably also stored on the authentication server.

It is also checked whether the allocation of stored serial numbers and stored batch numbers matches the allocation of read-out batch numbers and read-out serial numbers. If the individual numbers and also the allocations match, an authentication signal is output to the mobile terminal. The connection between mobile terminal and database server can be effected via a conventional, preferably wireless, connection such as a WLAN connection into the internet, a 3G/4G/5G connection into the internet or a similar connection.

In particular, the authentication system mentioned at the beginning is used to carry out the authentication method.

It is furthermore possible for the authentication system further to have a second read algorithm for the second graphic code, which reads out the second graphic code and wherein the read-out first graphic code, in particular the batch number, and the read-out second graphic code, in particular the serial number, are authenticated by means of the authentication server.

In particular, the Fourier back-transformation program can be downloaded onto the mobile terminal, but it can also be the case that the binarized two-dimensional Fourier pattern captured by the camera is transmitted by means of the transceiver unit to the authentication server. Likewise, the first and the second read algorithm can be stored either on the mobile terminal or on the database authentication server. Expediently, however, both read programs, like the Fourier back-transformation program, are stored on the mobile terminal, with the result that only the already read-out batch-specific batch numbers or first graphic codes and the read-out unique serial numbers or second graphic codes need to be transmitted to the authentication server via the transceiver unit of the mobile terminal. The numbers can be transmitted with a much smaller data volume than the Fourier pattern scanned in by the camera.

BRIEF DESCRIPTION OF THE DRAWINGS

In the following the invention is explained by way of example with reference to several embodiment examples with the aid of the accompanying drawings. The embodiment examples shown are therefore not to be understood as limitative.

DETAILED DESCRIPTION

Figure 1:
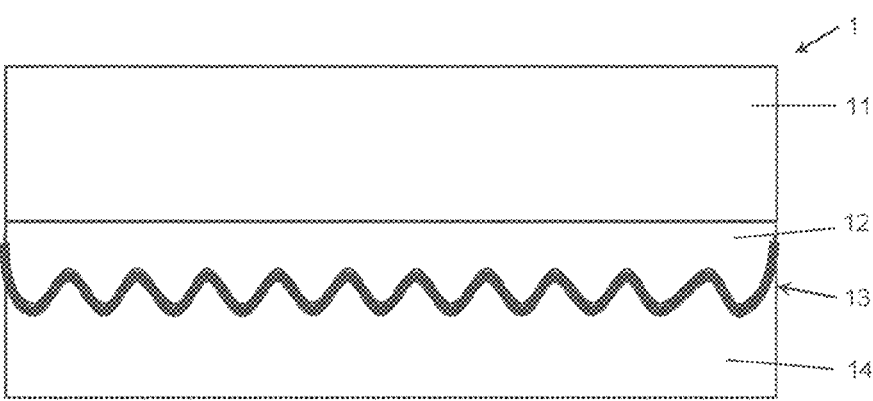
FIG. 1 shows a schematic representation of a multilayer body

FIG. 1 shows a schematic representation of a multilayer body 1. The multilayer body 1 can be for example a laminating film or a transfer film. It is also possible for the multilayer body 1 to serve to provide a security document with at least one security element protected against forgery.

In the representation shown in FIG. 1 the multilayer body 1 has a carrier layer 11 and a replication layer 12. A first graphic code 21 Fourier-transformed into a binarized two-dimensional Fourier pattern 24 is embedded in this replication layer 12 by means of a stamping structure. In the design according to FIG. 1 the stamping structure is designed over the whole surface. However, it is also possible for the stamping structure to be molded at least partially in a first region in the replication layer 12. In addition, the multilayer body 1 has a metal layer 13 applied over the stamping structure of the replication layer 12. The binarized two-dimensional Fourier pattern 24 thereby appears optically variable. This significantly increases the protection against forgery of the Fourier pattern. This is because the optical variability of the Fourier pattern cannot be captured by conventional copying by means of a commercially available copier or the combination of a commercially available camera and a commercially available printer.

The metal layer 13 is preferably formed individually or as an alloy or as a eutectic, selected from: aluminum, chromium, gold, copper, tin, indium, silver. The metal layer 13 is preferably produced by means of vapor deposition, in particular by means of vacuum vapor deposition. The vapor-deposited metal layer 13 can be effected over the whole surface and optionally preserved over the whole surface or else be structured with known demetallization methods such as etching, lift-off (washing varnish method) or photolithography and thereby be only partially present then. The layer thickness of the metal layer lies in particular between 10 nm and 500 nm.

However, the metal layer 13 can also consist of a printed layer, in particular of a printed layer of metal pigments in a binder. These printed metal pigments can be applied over the whole surface or partially and/or have different colorings in different regions of surface. The layer thickness of the metal layer of metal pigments lies in particular between 1 μm and 10 μm.

It is also possible to produce the metal layer 13 from a varnish with electrically conductive metallic pigments, in particular to print and/or pour it on.

Alternatively, instead of the metal layer 13, an HRI or LRI layer (high refractive index—HRI, low refractive index—LRI) can also be used. Such a dielectric HRI or LRI layer consists, for example, of a vapor-deposited layer of a metal oxide, metal sulfide, titanium oxide etc. The layer thickness of such a layer is preferably 10 nm to 500 nm.

Further, the multilayer body 1 according to FIG. 1 also comprises an adhesive layer 14. This adhesive layer 14 produces the adhesion to the target substrate after application. Alternatively, there can also be a primer layer here. In this case, an adhesive layer 14 is then applied either to the multilayer body 1 or to the target substrate before the application. The primer layer increases the adhesion to the adhesive.

The adhesive layer 14 and/or the primer layer 14 is preferably formed of a varnish selected individually, in several partial layers and/or as a mixture from: PMMA, PVC, acrylate, polyamide, polyvinyl acetates, hydrocarbon resins, polyesters, polyurethanes, chlorinated polyolefins, polypropylene, epoxy resins and/or polyurethane polyols, in particular in combination with inactivated isocyanates, fillers, for example $SiO_2$ and/or $TiO_2$. The adhesive layer 14 or the primer layer 14 can moreover contain fillers, such as for example $SiO_2$ and/or $TiO_2$. A primer layer can also be provided in addition to an adhesive layer.

The layer thickness of the adhesive layer 14 and/or of the primer layer 14 is preferably between 0.5 μm and 20 μm, particularly preferably between 1.5 μm and 5 μm. The adhesive layer 14 and/or the primer layer 14 can be produced by means of gravure printing, flexographic printing, screen printing, inkjet printing and/or by means of a slot die.

Furthermore, the adhesive layer 14 or the primer layer 14 fulfills the purpose of filling in the depressions in the stamping structure. It is thereby ensured that the depressions and/or elevations of the stamping structure are encapsulated and are thus protected from external environmental influences.

A target substrate can be for example a security document, in particular identification document or passport. However, it is also possible for the target substrate to be a packaging material. However, target substrates made of cardboard or paper are also conceivable.

Figure 2:
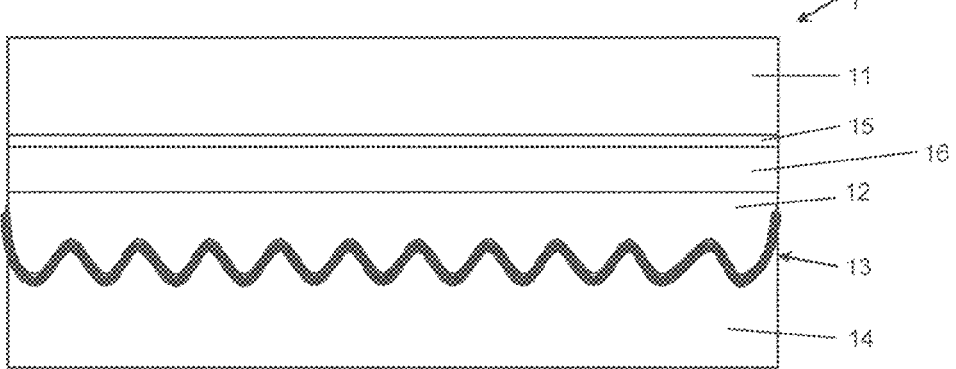
FIG. 2 shows a schematic representation of a multilayer body

A further schematic representation of a multilayer body 1 is shown in FIG. 2. The multilayer body 1 of FIG. 2 corresponds to the structure of the multilayer body 1 according to FIG. 1, but with the difference that a detachment layer 15 and a protective layer 16 are arranged between the carrier layer 11 and the replication layer 12. The detachment layer 15 can be present both partially and over the whole surface.

The detachment layer 15 ensures in particular that the layers of the multilayer body 1 can be separated from the carrier layer 11 non-destructively. The detachment layer 15 is preferably formed of waxes, polyethylene (PE), polypropylene (PP), cellulose derivatives and/or poly(organo)siloxanes. The above-named waxes can be natural waxes, synthetic waxes or combinations thereof. The above-named waxes are, for example, carnauba waxes. The above-named cellulose derivatives are, for example, cellulose acetate (CA), cellulose nitrate (CN), cellulose acetate butyrate (CAB) or mixtures thereof. The above-named poly(organo) siloxanes are, for example, silicone binders, polysiloxane binders or mixtures thereof. The detachment layer 15 preferably has a layer thickness in the range of from 1 nm to 500 nm, in particular a layer thickness in the range of from 5 nm to 250 nm, in particular preferably in the range of from 10 nm to 250 nm.

The detachment layer 15 can be produced by means of known printing methods. In particular, gravure printing, flexographic printing, screen printing, inkjet printing or application by means of a slot die is suitable for this. However, the detachment layer 15 can also be formed by vapor deposition, physical vapor deposition (PVD), chemical vapor deposition (CVD) and/or sputter deposition.

The protective layer 16 is preferably a thermoplastic layer or a thermally curing layer or a radiation-curing layer of a varnish, selected individually, in several partial layers and/or as a mixture from: PMMA, PVC, melamine, acrylates, polyurethanes, crosslinkers, photoinitiators, additives, antifoaming agents, leveling agents, wetting agents. The protective layer can also consist of a radiation-curing dual-cure varnish. This dual-cure varnish can be thermally pre-cross-linked in a first step during and/or after application in liquid form. Preferably, in a second step, in particular after the processing of the multilayer film, the dual-cure varnish is radically post-crosslinked, in particular via high-energy radiation, preferably UV radiation. Dual-cure varnishes of this type can consist of different polymers or oligomers, which have unsaturated acrylate or methacrylate groups. These functional groups can be radically crosslinked with each other, in particular in the second step. For the thermal pre-crosslinking in the first step it is advantageous that at least two or more alcohol groups are also present in the case of these polymers or oligomers. These alcohol groups can be crosslinked with multifunctional isocyanates or melamine formaldehyde resins. Different UV raw materials such as epoxy acrylates, polyether acrylates, polyester acrylates and in particular acrylate acrylates preferably come into consideration as unsaturated oligomers or polymers. Both blocked and unblocked representatives based on TDI (TDI=toluene-2,4-diisocyanate), HDI (HDI=hexamethylene diisocyanate) or IPDI (IPDI=isophorone diisocyanate) can come into consideration as isocyanate. The melamine crosslinkers can be fully etherified versions, can be imino types or represent benzoguanamine representatives.

The protective layer 16 preferably has a layer thickness in the range of from 50 nm to 30 μm, preferably 1 μm to 5 μm. The protective layer 16 can be produced by means of gravure printing, flexographic printing, screen printing, inkjet printing, or by means of a slot die and/or by means of vapor deposition, in particular by means of physical vapor deposition (PVD), chemical vapor deposition (CVD) and/or sputter deposition.

Figure 3:
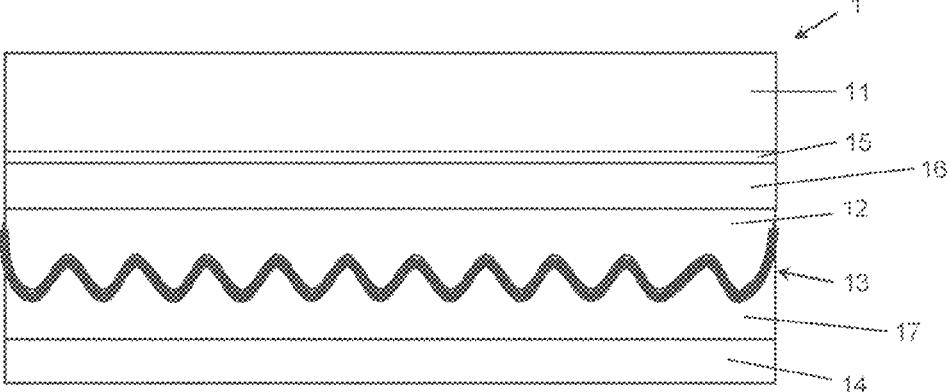
FIG. 3 shows a schematic representation of a multilayer body

A further schematic representation of a multilayer body 1 is shown in FIG. 3. This multilayer body 1 substantially corresponds to the multilayer body 1 from FIG. 2, but with the difference that it additionally has at least one compensation layer 17. This compensation layer 17 can be arranged between the replication layer 12 and the adhesive layer 14 or primer layer 14 or, as shown in FIG. 3, between the metal layer 13 and the adhesive layer 14 or primer layer 14.

The reading-out of the binarized two-dimensional Fourier pattern 24 is improved by the compensation layer 17, if the multilayer body 1 is applied to a target substrate with a rough substrate, for example uncoated cardboard. Tests under different light conditions have revealed that the reading-out of the Fourier pattern with the smartphone is made more difficult without the compensation layer 17.

The compensation layer 17 is preferably applied by means of printing methods. Gravure printing, flexographic printing, screen printing, inkjet printing or by means of a slot die is preferably suitable for this. However, the compensation layer 17 can also be formed by vapor deposition, physical vapor deposition (PVD), chemical vapor deposition (CVD) and/or sputter deposition.

Figure 4:
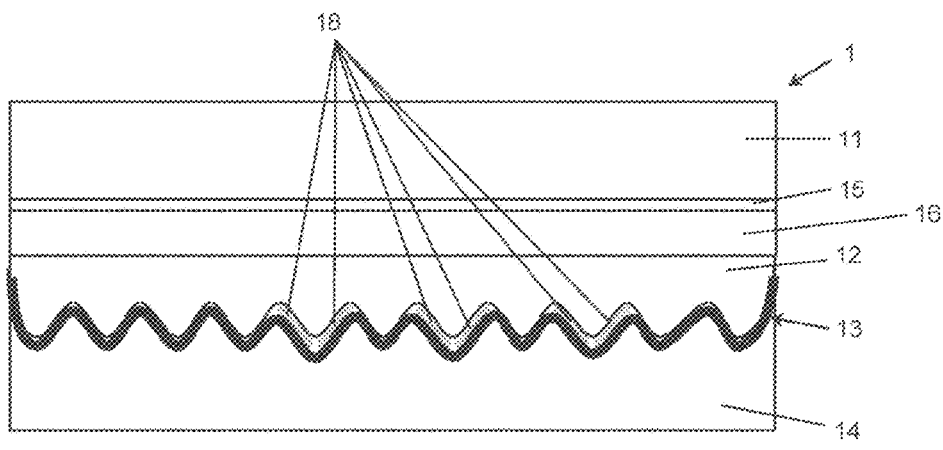
FIG. 4 shows a schematic representation of a multilayer body

A further schematic representation of a multilayer body 1 is represented in FIG. 4. The multilayer body 1 substantially corresponds to the embodiment according to FIG. 2, but with the difference that the second graphic code is applied in the form of a print 18 behind the replication layer 12 by applying the print 18 to the replication layer 12 at least partially in a second region.

The stamping structure of the binarized two-dimensional Fourier pattern 24 is applied over the whole surface in a first region, wherein the first region extends over the entire surface area of the multilayer body 1. The second region is arranged overlapping the first region. The print 18 thus covers the binarized two-dimensional Fourier pattern 24 in the second region.

The print 18 can be applied to a not yet replicated replication layer 12. The replication layer 12 or the replication varnish has in particular still smooth surfaces. The replication is then effected in particular after the print 18 has been provided. The stamping structures of the binarized two-dimensional Fourier pattern 24 can be introduced both into the print 18 and into the replication layer 12 through the replication. A batch-specific item of information in the replication layer 12 in the form of the binarized two-dimensional Fourier pattern 24 can e.g. be combined with an individualized, in particular series-specific, print 18 in the form of the second graphic code. A replication in the print 18 can represent an additional protective measure against forgery because the print 18 is thereby integrated even more into the overall system of the multilayer film.

Ideally, the print 18 is applied to a substantially smooth surface of the replication layer 12 or the replication varnish, wherein the surface is then preferably replicated at least in regions at a later point in time.

However, it is also possible for the print 18 to be applied to an already replicated replication layer 12, thus also to a replication layer 12 which is already provided with the stamping structure of the binarized two-dimensional Fourier pattern 24. The print 18 is preferably applied to the stamping structure or the replication layer 12 at least in regions or at least partially in the second regions.

If the print 18 is applied to an already replicated replication layer 12, at least partial regions of the stamping structures can then be erased by it, if the print 18 has a refractive index similar to the replication layer 12, in particular with a refractive index with a difference smaller than 0.2. This occurs in particular when the print 18 is applied with a layer thickness which is greater than the depth of the structures.

However, it is also possible for the ink to be applied in a smaller layer thickness, in such a way that the print 18 follows the topology of the structures and thus in particular becomes part of the diffraction. This is conceivable in particular when a solvent ink is used.

Furthermore, the print 18 can also be applied such that the print 18 only partially fills the stamping structures on the surface of the replication layer 12. An only partial filling of the stamping structures occurs in particular when the finally applied layer thickness of the print 18 is less than the depth of the replication structures 28. Under specific conditions the print 18 can also fill in the stamping structures without them being optically erased. This is the case in particular when the print 18 has reflective or highly refractive properties and differs in its complex refractive index in particular by more than 0.2 from the complex refractive index of the replication layer 12. An example of reflective prints are inks with metal effect pigments or metal flakes. An example of highly refractive inks are inks based on liquid crystals.

The print 18 is preferably applied to the replication layer 12 with a layer thickness which is greater than the depth of the stamping structures to be introduced into the replication layer 12. In particular, the layer thickness of the applied print 18 is substantially twice as thick as the layer thickness of the stamping structures to be introduced into the replication layer 12. A layer thickness of the print 18 that is at least twice as great as the depth of the structures to be introduced into the replication layer 12 is advantageous when a replication is not carried out until after the application of the ink. It is thereby prevented that, during the replication, the stamping structures introduced completely penetrate the applied print 18. It is thus ensured thereby that the second graphic code can always be captured by machine.

In another embodiment example, the print 18 is preferably applied with a layer thickness less than the depth of the stamping structures to be introduced into the replication layer 12. During the replication, the print 18 can thereby be penetrated with the stamping structures introduced through the entire layer thickness of the print 18, whereby the print 18 can receive, through the stamping structures going through, a high-resolution fine structuring which is also visible from the carrier layer 11 and which exceeds the print resolution of conventional inkjet printers and thus represents a further security feature.

The replication layer 12 is preferably formed of a thermoplastic varnish or of a radiation-curing varnish, selected individually, in several partial layers and/or as a mixture from: acrylate, cellulose, PMMA, polyurethanes, isocyanates. The replication layer 12 can also consist of a thermoplastic varnish. A stamping structure is preferably molded into the varnish by means of heat and pressure 18 through the action of a stamping tool. Further, it is also possible for the replication layer 12 to be formed by a UV-crosslinkable varnish and the stamping structure to be molded into the replication layer 12 by means of UV replication. The surface structure is molded onto the uncured replication layer 12 through the action of a stamping tool and the replication layer 12 is cured directly during or after the molding by irradiation with UV light. The stamping tool can be produced either directly or via further production stages, such as e.g. galvanic molding and/or laser engraving and/or mechanical molding or can serve as a template for a further stamping tool.

In principle, the replication layer 12 can be produced by means of the known printing methods. In particular, gravure printing, flexographic printing, screen printing or inkjet printing is suitable. However, production by means of a slot die is also possible.

The stamping structure molded in the replication layer 12 is preferably nanostructures and/or microstructures, in particular diffractive gratings, scattering matte structures, reflective facets and/or reflective microstructures, which form the binarized two-dimensional Fourier pattern 24.

The binarized two-dimensional Fourier pattern 24 is preferably formed of light pixels 31 and dark pixels 32, which are arranged within a two-dimensional grid with a resolution of M×N pixels.

If the light pixels 31 and dark pixels 32 of the binarized two-dimensional Fourier pattern 24 are formed of diffractive gratings, it is preferably provided that the gratings of the light pixels 31 and of the dark pixels 32 differ by the grating period and/or grating depth and/or orientation. The gratings can be linear or crossed or serpentine gratings or can also comprise more complex variants. The profile shape can be sinusoidal, blazed or more complex. The grating period of the diffractive gratings preferably lies in a range of from 200 nm to 20 μm, preferably from 250 nm to 10 μm. In particular, the grating depth of the diffractive gratings lies in a range of from 50 nm to 2 μm. Further, it is possible for the grating depth of the diffractive gratings to be 5% to 20% of the grating period.

However, it is also possible for the light pixels 31 and dark pixels 32 to be formed by a structures appearing light or dark in direct reflection, wherein the structures appearing dark comprise high-frequency and deep crossed grating structures and/or crossed gratings and/or hexagonal gratings and/or mirrors, and/or wherein the structures appearing light comprise static and/or dynamic matte structures and/or Fourier holograms. The grating period of the crossed gratings and/or hexagonal gratings preferably lies in a range of from 200 nm to 450 nm. Furthermore, it is possible for the grating depth of the crossed gratings and/or hexagonal gratings to be more than 150 nm. It is preferably provided that the average spacing of the matte structures lies in a range of from 500 nm to 5 μm and the average depth of the matte structures lies in a range of from 100 nm to 2 μm.

However, it is also conceivable that the light pixels 31 and dark pixels 32 are formed by blazed gratings, wherein the orientation of the blazed grating in the light pixels 31 and the dark pixels 32 differs by at least 150° and is in particular approx. 180°. The grating period of the blazed gratings preferably lies in a range of from 3 μm to 20 μm and/or the grating depth of the blazed gratings lies in a range of from 500 nm to 2 μm.

The replication layer 12 preferably has a layer thickness of between 200 nm and 5 μm. If the replication layer 12 has a diffractive surface structure, then the layer thickness is preferably between 0.3 μm and 6 μm.

The replication or structuring of a surface of the replication layer 12 can be effected in different ways. In the case of thermoplastic replication layers 12, a thermal replication is effected, in particular under the action of heat and/or pressure 18. A print 18, in particular the second graphic code, can already have been applied to the replication layer 12 at this point in time. In this case, the print 18 was substantially applied to a smooth surface of the replication layer 12.

It is also conceivable that a UV replication is effected. If the print 18, in particular the second graphic code, is formed with a UV-curable ink, the UV print can advantageously be protected with the UV-curing replication varnish. Reactive groups which "initially crosslink" on the UV-curable replication varnish are located on the surface of the UV-curable ink. The crosslinking and thereby also the stability of especially thin prints with UV-curing inks can in particular be improved because, through encapsulation in the UV-replication varnish during the UV curing, the inhibition effects that are then active in particular in the case of thin UV-curing layers are minimized. Through the described encapsulation, a smaller layer thickness of the print 18 formed with the UV-curing ink can also be realized without complex and expensive inertization measures. Mechanical stresses due to contact pressures and/or thermal stresses, as in the case of thermal replication, can also be reduced.

The replication layer 12 is preferably provided with a metal layer 13 or an HRI layer with a high refractive index (HRI=High Refractive Index). The metal layer 13 and the HRI layer can be opaque, semi-transparent or transparent, in particular wherein the transparency can be dependent on the observation angle.

As is to be seen in FIG. 4, the metal layer 13 covers the print 18, in particular the second graphic code, over the whole surface. Since the direction of observing the applied multilayer body 1 is effected onto the replication layer 12, however, the metal layer 13 forms a background for the print 18 or the second graphic code.

Figure 5:
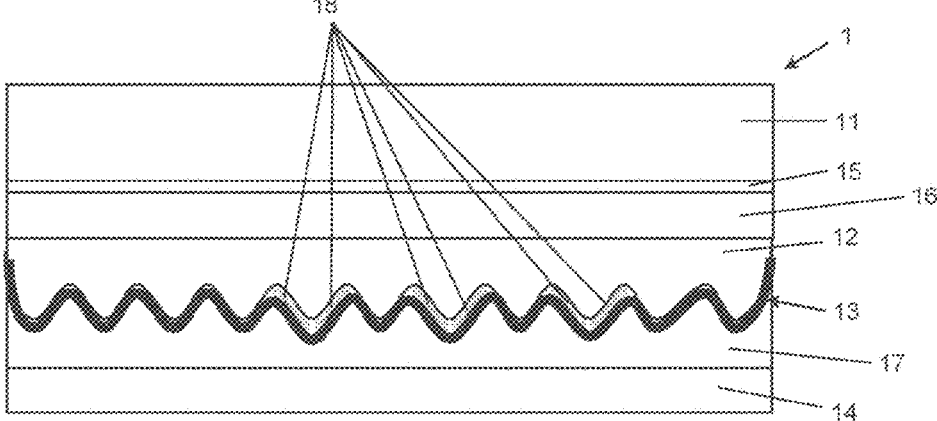
FIG. 5 shows a schematic representation of a multilayer body

A further schematic representation of a multilayer body 1 is shown in FIG. 5. The multilayer body 1 substantially corresponds to the embodiment according to FIG. 4, but with the difference that the multilayer body 1 now further has a compensation layer 17. As already described in relation to FIG. 3, this compensation layer 17 can be arranged between the replication layer 12 and the adhesive layer 14 or, as shown in FIG. 5, between the metal layer 13 and the adhesive layer 14. With respect to the specifications of the compensation layer 17, reference may be made to the passages of text further above.

Figure 6:
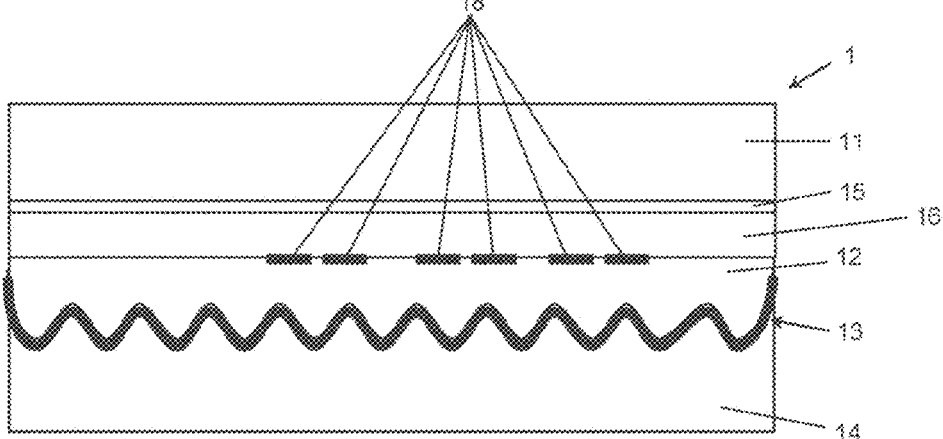
FIG. 6 shows a schematic representation of a multilayer body

A further schematic representation of a multilayer body 1 is shown in FIG. 6. This corresponds to the structure of the multilayer body 1 according to FIG. 4, but with the difference that the print 18 or the second graphic code in FIG. 6 is now applied in front of the replication layer 12.

As is to be seen in FIG. 6, the print 18 is applied to the protective layer 16 at least partially in a second region, wherein the protective layer 16 is preferably formed over the whole surface. A multilayer body 1 is thus obtained in which a print 18 or the second graphic code is arranged on the protective layer 16 at least in regions. In particular, the print 18 is arranged, in the viewing direction, underneath the protective layer 16 and thus also protected by the protective layer 16 from mechanical, chemical and/or physical influences.

In an alternative design, it can be provided that the print 18 is applied to a detachment layer 15 at least partially in a second region, in particular wherein the detachment layer 15 is formed over the whole surface. A multilayer body 1 is thus obtained in which at least one print 18 or a second graphic code is arranged on the detachment layer 15 at least in regions.

Figure 7:
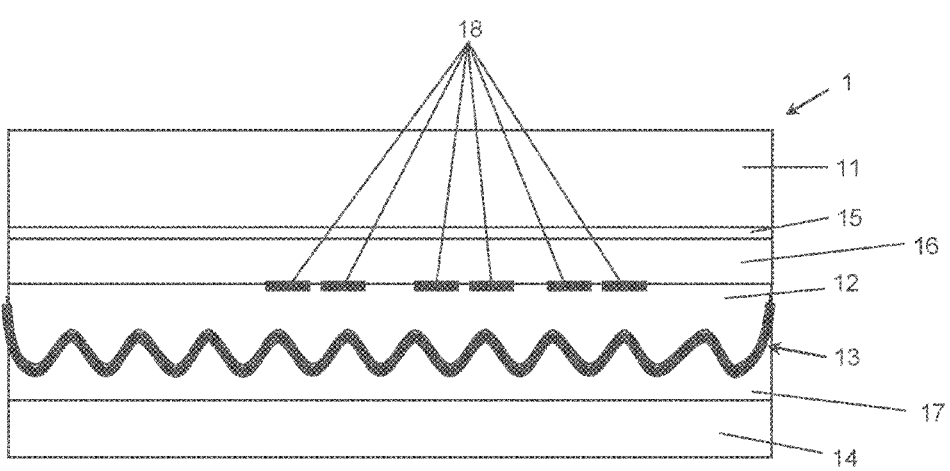
FIG. 7 shows a schematic representation of a multilayer body

A further schematic representation of a multilayer body 1 is represented in FIG. 7. The multilayer body 1 corresponds to the structure of the multilayer body 1 from FIG. 6, but with the difference that the multilayer body 1 according to FIG. 7 also has a compensation layer 17.

Figure 8:
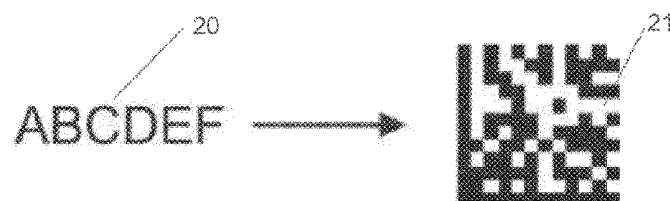
FIG. 8 shows an encoding of a batch number in a data matrix code as first graphic code

The encoding of a batch number 20, in this case the sequence ABCDEF, in a data matrix code as first graphic code 21 is represented in FIG. 8. The batch number 20 can be designed largely as desired, it can be a sequence of letters, characters, numbers, bits or a combination thereof. The batch number 20 is encoded in a data matrix code according to FIG. 8. The data matrix code is the machine-readable first graphic code 21 in this embodiment example. The data matrix code is the same for each multilayer body 1 of a batch.

The batch number 20 can also be encrypted in any other machine-readable code. For example, the batch number 20 in FIG. 8 can also be encoded in a QR code or a barcode.

The first graphic code 21, here the data matrix code, is then preferably converted into an associated Fourier pattern. For this, the first graphic code 21 is positioned in an empty image template 22 according to FIG. 9. The plane is regarded as a frequency plane. The function is defined in the frequency plane, which is spanned by an fx frequency and an fy frequency. Depending on where in the fx, fy plane the data matrix code is positioned, it is formed by higher or lower frequencies. The image template has a size of M×N pixels.

Figure 10A:
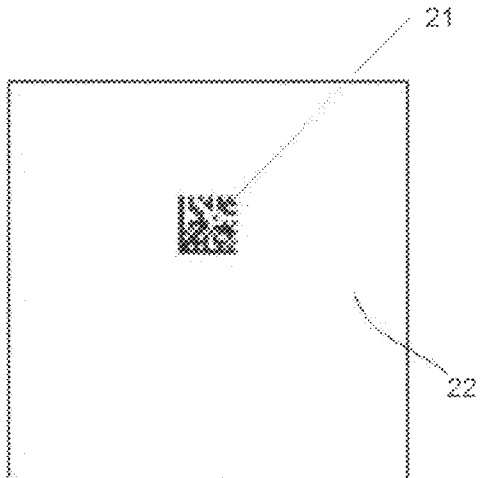

A function G(fx,fy) is then formed from the arrangement of the first graphic code 21 in the empty image template. The image template of M×N pixels forms the definition range of the function G(fx,fy). The function G(fx,fy) consists of the product of an amplitude function and a phase function. The amplitude function is represented graphically in FIG. 10*a* for the data matrix code in FIG. 8. The amplitude function is 0 at the white points and 1 or another constant value at the black points. This means that the amplitude function is formed as a real-valued function with the function values 0 and 1.

The amplitude function is multiplied by a suitable phase function $e^{i\varphi}$(fx,fy). The phase function $e^{i\varphi}$(fx,fy) can be a random phase, but other phase distributions are also known in the state of the art (Akahori, H., Comparison of deterministic phase coding with random face coding in terms of dynamic range, Appl. Opt. 12, pp. 2336-43 (1973)). In the case of a random phase, however, the substantial advantage is offered that a random phase is allocated to each frequency in the image template. This makes it easier to read out the binarized two-dimensional Fourier pattern 24 later.

Figure 10B:
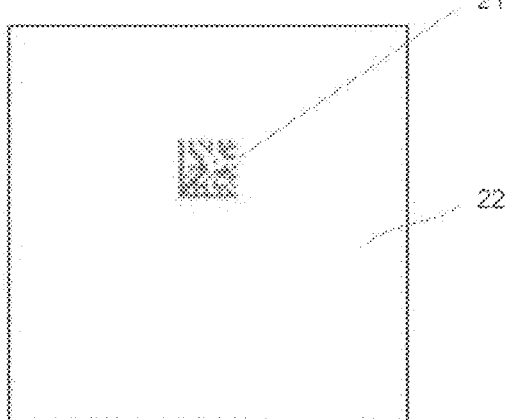

The phase chosen here $\varphi$(fx,fy) is formed as random grayscale value of the data matrix code and represented in FIG. 10*b*. The outlines of the phase correspond to the data matrix code, except that the values are not 0 (white) and 1 (black), but are random grayscale values between white and black. Within the data matrix code, a random grayscale value between white and black is allocated to each pixel. An allocation of the grayscale values to numbers between 0 and $2\pi$ takes place now. The phase is $2\pi$ if this grayscale value is black and the phase is 0 if the grayscale value is white. The other grayscale values are allocated to an angle between 0 and $2\pi$ depending on the grayscale. The blacker the color is, the larger the angle is. In this way, the random grayscale image can be uniquely converted into a phase function, and the complex-valued function G(fx,fy) is found by multiplying the amplitude function represented graphically in FIG. 10*a* by the phase function in FIG. 10*b* $e^{i\varphi}$(fx,fy).

Figure 9:
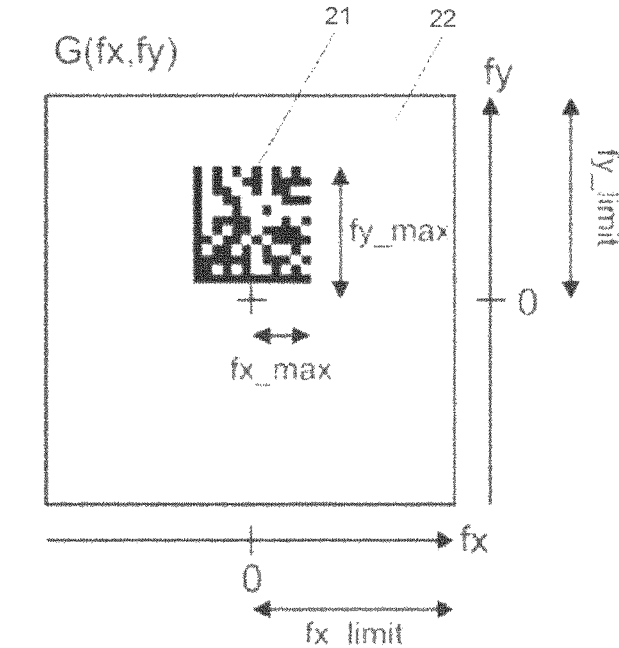
FIG. 9 shows the positioning of the data matrix code as first graphic code in an image template FIG. 10$a$ shows the amplitude function of the first graphic code positioned in the image template FIG. 10$b$ shows the phase function of the first graphic code positioned in the image template FIG. 11$a$ shows the Fourier pattern as the real part of the Fourier transformation of the first graphic code in FIGS. 10$a$ and 10$b$ FIG. 11$b$ shows the Fourier pattern of FIG. 11$a$ in a 50% binarization FIG. 11$c$ shows the Fourier pattern of FIG. 11$a$ in a 20% binarization FIG. 12$a$ shows the amplitude of the Fourier back-transformation of the Fourier pattern in FIG. 11$a$

The complex function G(fx,fy) is formed on a definition range according to FIG. 9 of M×N pixels, wherein M denotes the number of pixels in the fx direction and N denotes the number of pixels in the fy direction. In the example, M=N=512. The complex function G(fx,fy) is Fourier-transformed in the usual way, whereby a new two-dimensional complex function forms on M×N pixels, the two-dimensional Fourier transform g(x,y). As an alternative to the Fourier transformation, in this method an inverse Fourier transformation or a Fourier back-transformation can also be used, since no differences relevant to the invention result because of the symmetry conditions between Fourier transformation and inverse Fourier transformation.

Figure 11A:
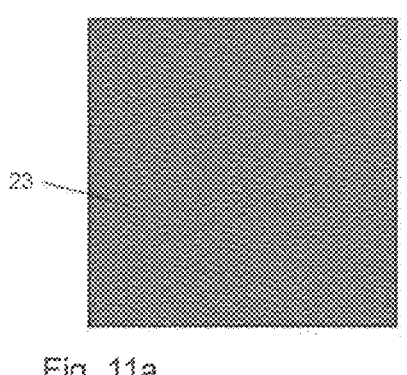

The real part of the Fourier transformation g(x,y) is called two-dimensional Fourier pattern 23 here and is represented in FIG. 11*a*. The two-dimensional Fourier pattern 23 is likewise batch-specific and has grayscale values between white and black.

Figure 11B:
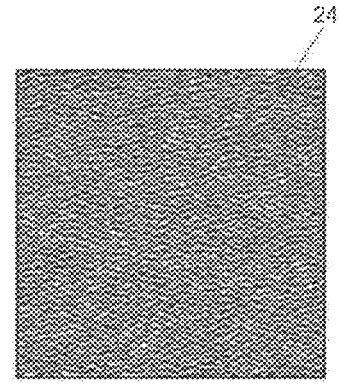
Figure 11C:
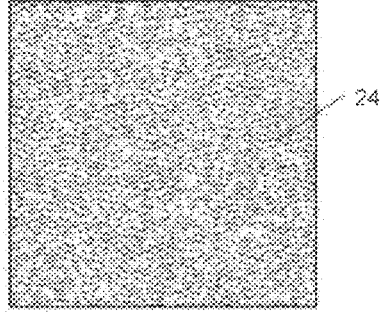

FIG. 11*b* and FIG. 11*c* show so-called binarized Fourier patterns 24 of the Fourier pattern 23 of FIG. 11*a*. Binarization means that either a pixel value 1 or a pixel value 0 is allocated to each pixel of the Fourier pattern 23 in FIG. 11*a*. Black is used as pixel value 1 and white is used as pixel value 0. However, two different grayscale values or also two different color values are also conceivable. For the binarization, various methods are known from the literature for computer-generated holograms, e.g. the detour-phase method (Goodman, J. W., Introduction to Fourier Optics, McGraw-Hill (New York) (1996)).

A preferred method, which is also used here, is the discrete binarization of the real part of the Fourier transform g(x,y). Here, a threshold value is chosen, and all values of the real part of the Fourier transform g(x,y) which lie below the threshold value are allocated to the pixel value 0 and all other values are allocated to the pixel value 1. The threshold value can be chosen such that, as happens in FIG. 11*b*, 50% obtain the pixel value 1, thus are black, and 50% obtain the pixel value 0, thus are white. FIG. 11b represents a 50% binarized two-dimensional Fourier pattern 24. However, the threshold value can also be chosen such that any desired other percentage receives the pixel value 1 and the rest of the pixels receive the pixel value 0. A 20% binarized two-dimensional Fourier pattern 24 is represented in FIG. 11c. The percentage of the binarization is preferably less than 50%, further preferably less than 20%. The binarization is usually approx. 15%.

Figure 12A:
FIG. 12*b* shows the amplitude of the Fourier back-transformation of the binarized two-dimensional Fourier pattern in FIG. 11*b*
FIG. 12*c* shows the amplitude of the Fourier back-transformation of the binarized two-dimensional Fourier pattern in FIG. 11*c*
Figure 12B:
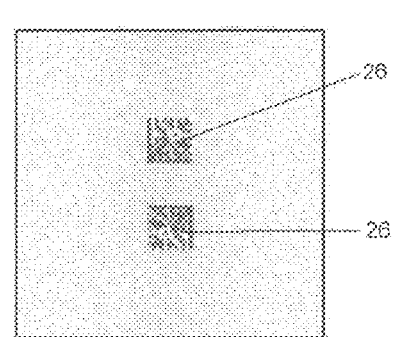
Figure 12C:
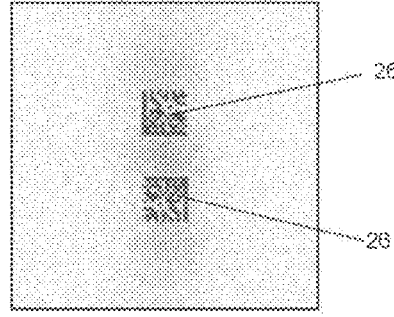

The amplitude of a Fourier back-transformation 25, 26 of the Fourier patterns 23, 24 in FIGS. 11a, 11b, 11c is represented in FIGS. 12a, 12b, 12c. It is recognizable that a symmetrical so-called negative order forms through the use of the real part as Fourier pattern. It is furthermore recognizable that the binarization increases the noise (gray shadows in the background), wherein a low binarization leads to a greater noise. Nevertheless, the back-transformed Fourier pattern 25, 26 in FIGS. 12a, 12b, 12c is kept machine-readable in each case.

Figure 13A:
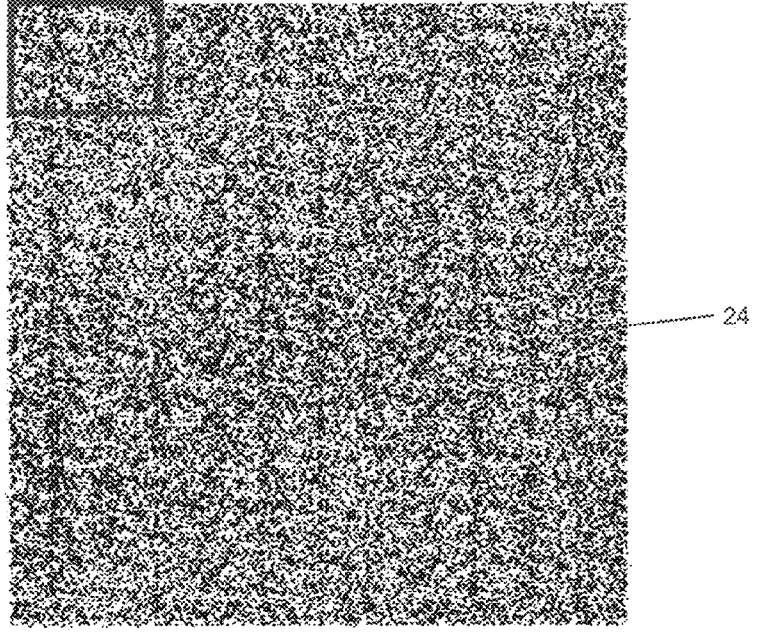
FIG. 13*a* shows the applied transfer ply of a multilayer body on a paper substrate in the top view

An applied multilayer body 1 on a paper substrate in the case of perpendicular observation onto the surface of the multilayer body 1 is represented in FIG. 13a. FIG. 13a is a black-and-white scan in a scan resolution of 1200 dpi. A transfer ply of the multilayer body 1 was applied to the paper substrate over the whole surface by means of cold stamping and then the carrier layer 11 was detached. A binarized two-dimensional Fourier pattern 24 over the whole surface, which is optically variable, is thus recognizable for the observer. Because the binarized two-dimensional Fourier pattern 24 is optically variable, it cannot be duplicated by conventional printers or copiers. An additional protection against forgery is thus provided. A GC 2 chromo board was used as paper substrate.

The layer structure of the applied multilayer body 1 can correspond to the structure according to FIG. 3. The applied transfer ply of the multilayer body 1 thus comprises, in the named order, a protective layer 16, a replication layer 12, a metal layer 13, a compensation layer 17 and a primer layer. A binarized two-dimensional Fourier pattern 24 is molded as a stamping structure over the whole surface into the replication layer 12 in a first region, which extends over the whole surface of the entire surface of the multilayer body 1.

Figure 13B:
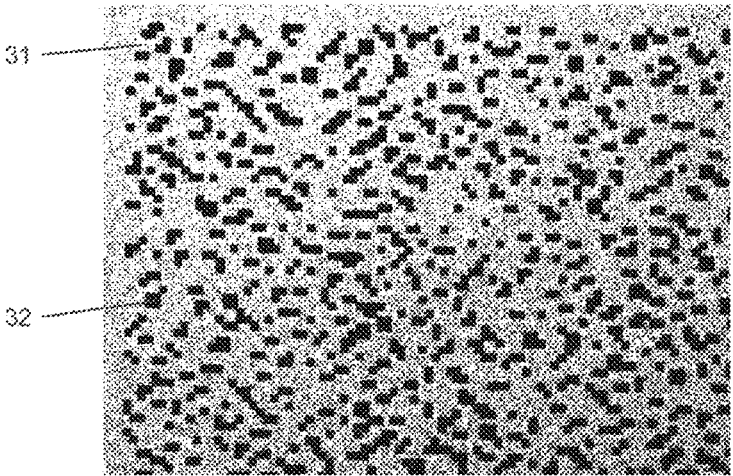
FIG. 13*b* shows a nickel shim having with the stamping structure in a micrograph

A detail view of the nickel shim which was used for the replication of the stamping structure into the replication layer 12 of the applied multilayer body 1 from FIG. 13a is represented in FIG. 13b. The section of the nickel shim represented in FIG. 13b corresponds to the upper left corner of the binarized two-dimensional Fourier pattern 24 from FIG. 13a. The total size of the section in the original corresponds to a surface area of approx. 15 mm$^2$. The nickel shim can be used either directly or via further production stages, such as e.g. galvanic molding and/or laser engraving and/or mechanical molding, as a stamping tool or serve as a template for a stamping tool.

The light pixels 31 and the dark pixels 32 of the stamping structure are recognizable in FIG. 13b, wherein each pixel has a surface area of 30 μm$^2$. The dark pixels 32 are designed as diffractive gratings and the light pixels 31 are designed as a scattering matte structure. Through this combination, a sufficiently good contrast between the light pixels 31 and dark pixels 32 is achieved, which can be captured later by a mobile terminal and its camera.

In its two lateral directions, a pixel preferably has a length of less than 45 μm, in particular less than 30 μm. The surface area of a pixel is preferably less than 1800 μm$^2$, in particular less than 900 μm$^2$.

As already described further above, a protection against copying with respect to conventional printers and copiers is guaranteed by the resolution of the binarized two-dimensional Fourier pattern 24. Commercially available printers usually have a print resolution of under 600 dpi, with the result that when the binarized two-dimensional Fourier pattern 24 is photographed and the photographed binarized two-dimensional Fourier pattern 24 is printed out again so much information is lost that a reconstruction of the first graphic code 21 is no longer possible.

However, the effective resolution of the binarized two-dimensional Fourier pattern 24 is preferably greater than the equivalent print resolution of conventional printers, in particular greater than 600 dpi. It is further preferably provided that the binarized two-dimensional Fourier pattern has an effective resolution of at most 2500 dpi, preferably at most 1200 dpi, particularly preferably at most 900 dpi. Such low resolutions are necessary in order that the structures can actually also be captured by commercially available cameras by means of normal imaging.

Figure 14:
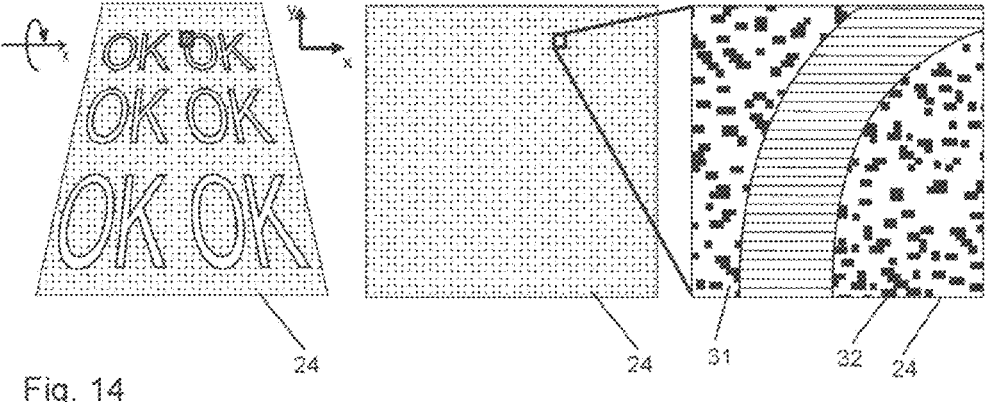
FIG. 14 shows the Fourier pattern combined with a further optically variable nanostruture and/or microstructure

The two-dimensional Fourier pattern 24 binarized over the whole surface is advantageously combined with at least one further optically variable nanostructure and/or microstructure. This further optically variable nanostructure and/or microstructure can take the form of additional information such as logos, lettering or icons. Fine-line design elements such as guilloches are also possible. This is represented with the letters "OK" by way of example in FIG. 14. In this example the surface area with the letters is provided with a diffractive linear grating, whereby these letters light up with a characteristic rainbow effect when tilted. The further optically variable nanostructures and/or microstructures preferably reduce, in the example according to FIG. 14, the surface area of the binarized two-dimensional Fourier pattern 24. In order to ensure a reliable read-out of the binarized two-dimensional Fourier pattern 24, the surface coverage of the further optically variable nanostructures and/or microstructures is preferably smaller than 50%, further preferably smaller than 30% and in particular preferably smaller than 20%, in particular relative to the total surface area of the binarized two-dimensional Fourier pattern 24.

Figure 15A:
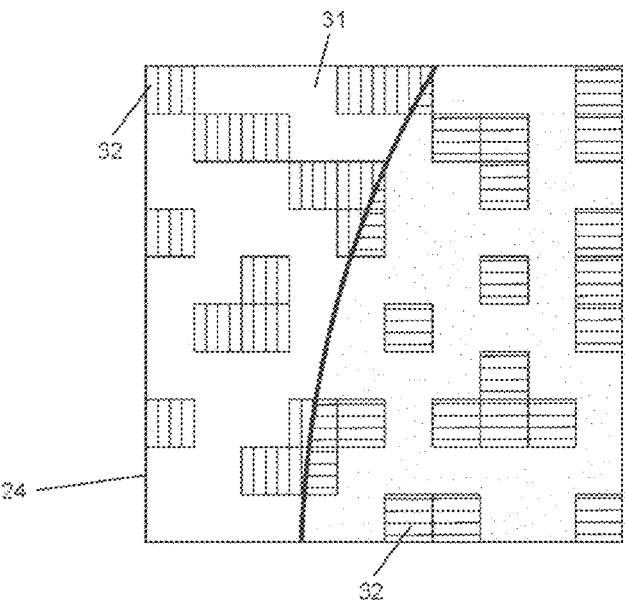
FIG. 15*a*-15*c* show lettering integrated in the two-dimensional Fourier pattern

Furthermore, it can be provided that logos, lettering and/or icons are integrated in the two-dimensional Fourier pattern 24 binarized over the whole surface in such a way that they are not visible in normal observation and only become recognizable when tilted about the horizontal and/or vertical axis. Unlike in the design shown in FIG. 14, this results in no loss of surface area for the binarized two-dimensional Fourier pattern 24. This is represented by way of example in FIGS. 15a to 15c. This can preferably be realized by altering the nanostructures and/or microstructures in the dark or light pixels locally such that, although they display the dark or light appearance in normal observation, when tilted they have a different optically variable behavior than in the background of the binarized two-dimensional Fourier pattern 24. For example, the dark pixels 32 can be provided with a high-frequency linear grating with a grating period of 400 nm (subwavelength gratings) and a grating depth of 200 nm. This linear grating is preferably vapor-deposited with aluminum and is subsequently embedded in one or more polymer layers. This linear grating preferably absorbs a part of the incident visible light, whereby these pixels appear dark in normal observation. This linear grating is preferably provided with an azimuthal angle of 0° in the dark pixels 32 in partial regions of the binarized two-dimensional Fourier pattern 24 with the additional information—for example the letters "OK" from FIGS. 15a to 15c—and with an azimuthal angle of 90° in the dark pixels 32 in partial regions of the binarized two-dimensional Fourier pattern 24 in which no additional information is present. All pixels provided with the linear grating appear dark in normal observation. FIG. 15a shows this schematically with reference to an example section with a partial region of the letter "O". In the partial region the two linear gratings with an azimuthal angle of 0° and of 90° are represented by different shading in the dark pixels 32.

Figure 15B:
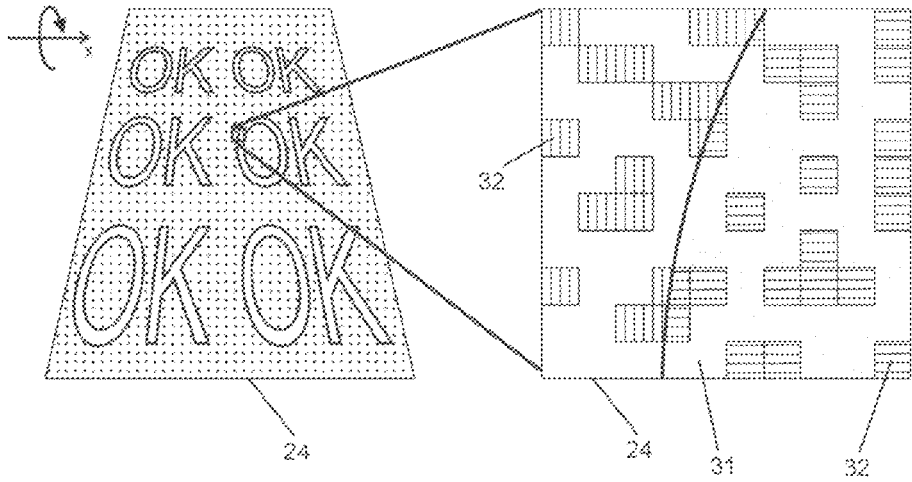
Figure 15C:
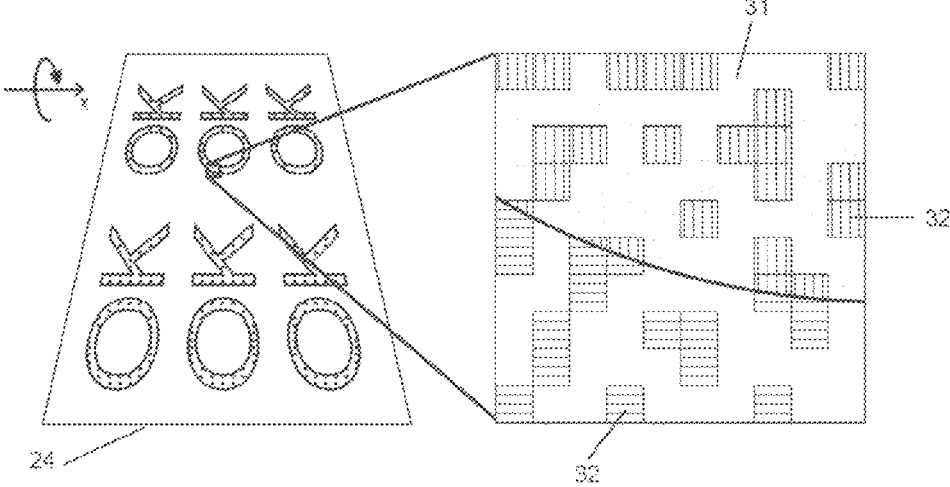

FIG. 15b now shows the entire two-dimensional Fourier pattern 24 binarized over the whole surface, in which the letters "OK" have been integrated into six regions by varying the azimuthal angle of the linear grating structure in the dark pixels 32. In the present example an azimuthal angle of 0° was chosen. When tilted greatly about the horizontal axis, these letters light up brightly, since the first diffraction order of the subwavelength gratings strikes the eye of the observer. The pixels without additional information, in which a linear grating with an azimuthal angle of 90° is present, on the other hand, do not light up, and appear dark. Thus, it can easily be checked whether the binarized two-dimensional Fourier pattern 24 has been created with the nanostructures and/or microstructures or whether it has been printed instead. If the multilayer body with the two-dimensional Fourier pattern 24 binarized over the whole surface in the greatly tilted state is now turned by 90°, then the pixels with the linear grating (linear subwavelength grating) without additional information light up brightly and the linear gratings with the additional information (letters "OK") appear dark. This change in contrast is a security feature that is easy to check.

Pixels appearing dark can preferably be realized even better by means of high-frequency crossed gratings. This is due to the fact that linear gratings primarily absorb one polarization direction of the incident light, but not or barely the other polarization direction. Crossed gratings on the other hand are capable of absorbing both polarization directions. These high-frequency crossed gratings therefore absorb incident visible light even more efficiently than linear gratings. In the case of crossed gratings, these are preferably turned by 45° in the azimuthal angle in partial regions with the additional information compared with the partial regions without additional information. The change in contrast between letters lighting up brightly and a dark background and dark letters on a light background is effected here with a turning by 45°.

LIST OF REFERENCE NUMBERS 1 multilayer body
 11 carrier layer
 12 replication layer
 13 metal layer
 14 adhesive layer/primer layer
 15 detachment layer
 16 protective layer
 17 compensation layer
 18 print
 20 batch number
 21 first graphic code
 22 empty image template
 23 two-dimensional Fourier pattern
 24 binarized two-dimensional Fourier pattern
 25 Fourier back-transformation of the two-dimensional Fourier pattern
 26 Fourier back-transformation of the binarized two-dimensional Fourier pattern 31 light pixels
 32 dark pixels

The invention claimed is:

1. A method for producing a multilayer body, wherein a replication layer is applied to a carrier layer, and a first graphic code is Fourier-transformed into a two-dimensional Fourier pattern and the two-dimensional Fourier pattern is binarized in order to obtain a binarized two-dimensional Fourier pattern, and the binarized two-dimensional Fourier pattern is transferred onto a stamping tool, and the binarized two-dimensional Fourier pattern is molded as a stamping structure into the replication layer at least partially in a first region by means of the stamping tool, and wherein a metal layer and/or an HRI layer and/or a primer layer and/or an adhesive layer are applied to the replication layer.

2. The method according to claim 1, wherein a detachment layer and/or a protective layer are applied to the carrier layer.

3. The method according to claim 1, wherein the binarized two-dimensional Fourier pattern is provided as nanostructures and/or as microstructures.

4. The method according to claim 1, wherein the binarized two-dimensional Fourier pattern is formed of light pixels and dark pixels, which are arranged within a two-dimensional grid with a resolution of M×N pixels.

5. The method according to claim 4, wherein the light pixels and dark pixels are formed of diffractive gratings, wherein the gratings of the light pixels and of the dark pixels differ by the grating period and/or grating depth and/or orientation.

6. The method according to claim 5, wherein the grating period of the diffractive gratings lies in a range of from 200 nm to 20 μm, and/or the grating depth of the diffractive gratings lies in a range of from 50 nm to 2 μm and/or the grating depth of the diffractive gratings is 5% to 20% of the grating period.

7. The method according to claim 4, wherein the light pixels and dark pixels are formed by structures appearing light or dark in direct reflection, wherein the structures appearing dark comprise high-frequency and deep crossed grating structures and/or crossed gratings and/or hexagonal gratings and/or mirrors, and/or wherein the structures appearing light comprise static and/or dynamic matte structures and/or Fourier holograms.

8. The method according to claim 7, wherein the grating period of the crossed gratings and/or hexagonal gratings lies in a range of from 200 nm to 450 nm and the grating depth of the crossed gratings and/or hexagonal gratings is more than 150 nm.

9. The method according to claim 7, wherein the average spacing of the matte structures lies in a range of from 500 nm to 5 μm and the average depth of the matte structures lies in a range of from 100 nm to 2 μm.

10. The method according to claim 4, wherein the light pixels and dark pixels are formed by blazed gratings, wherein the orientation of the blazed grating in the light pixels and the dark pixels differs by at least 150°.

11. The method according to claim 10, wherein the grating period of the blazed gratings lies in a range of from 3 μm to 20 μm and/or the grating depth of the blazed gratings lies in a range of from 500 nm to 2 μm.

12. The method according to claim 1, wherein the replication layer has a UV-curable replication varnish, which is precured or completely cured by means of UV radiation after molding of the stamping structure.

13. The method according to claim 12, wherein a metal layer is applied to the replication layer at least partially or over the whole surface.

14. The method according to claim 1, wherein the first graphic code is a machine-readable code.

15. The method according to claim 1, wherein the first graphic code is a batch-specific code.

16. The method according to claim 1, wherein a second graphic code is applied in the form of a print in front of the replication layer by applying the print to the carrier layer and/or to a detachment layer and/or to a protective layer at least partially in a second region, and/or wherein the second graphic code is applied in the form of a print behind the replication layer by applying the print to the replication layer and/or a metal layer and/or an HRI layer and/or an adhesive layer and/or a primer layer at least partially in a second region.

17. The method according to claim 16, wherein the print is effected by means of a digital printing method and is chosen from the group inkjet printing, thermal transfer printing, laser printing, laser engraving.

18. The method according to claim 16, wherein the print contains an ink and/or wherein the print is overmolded, coated over and/or encapsulated by a UV-curing replication varnish.

19. The method according to claim 18, wherein the application of the ink or the provision of the print is carried out in the same manufacturing step as the UV replication.

20. The method according to claim 18, wherein the ink and the UV-curing replication varnish are cured together and/or wherein the ink undergoes a post-crosslinking through the UV curing of the UV-curing replication varnish.

21. The method according to claim 18, wherein the ink is applied to a substantially smooth surface of the replication layer.

22. The method according to claim 16, wherein the replication layer is replicated together with the print applied thereto.

23. The method according to claim 16, wherein the print is applied to an already replicated surface of the replication layer.

24. The method according to claim 16, wherein the second graphic code is a machine-readable code.

25. The method according to claim 16, wherein the second graphic code is a unique code.

26. The method according to claim 16, wherein a URL of an authentication server is stored in the second graphic code.

27. The method according to claim 16, wherein the first region and the second region are arranged adjoining each other or spaced apart from each other or overlapping each other at least in regions.

28. The method according to claim 16, wherein the first graphic code, and/or the second graphic code are stored in an authentication database of an authentication server.

29. The method according to claim 28, wherein the binarized two-dimensional Fourier pattern and/or the second graphic code are captured with a mobile terminal and a data-carrying connection is produced between the mobile terminal and the authentication server and a piece of authentication software makes it possible to compare the data captured by the mobile terminal and transmitted to the authentication server and the read-out first graphic code stored in the authentication database.

30. The method according to claim 1, wherein at least one compensation layer is further applied.

31. The method according to claim 1, wherein the binarized two-dimensional Fourier pattern is molded with an effective resolution of at most 2500 dpi.

32. A multilayer body comprising a carrier layer and a replication layer arranged thereon, wherein an embedded first graphic code Fourier-transformed into a binarized two-dimensional Fourier pattern is molded as a stamping structure in the replication layer at least partially in a first region, and wherein a metal layer and/or an HRI layer and/or a primer layer and/or an adhesive layer are arranged on the replication layer.

33. The multilayer body according to claim 32, wherein a detachment layer and/or a protective layer are arranged between the carrier layer and the replication layer.

34. The multilayer body according to claim 32, wherein the binarized two-dimensional Fourier pattern is molded into the replication layer as nanostructures and/or microstructures.

35. The multilayer body according to claim 32, wherein the binarized two-dimensional Fourier pattern is formed of light pixels and dark pixels, which are arranged within a two-dimensional grid with a resolution of MxN pixels.

36. The multilayer body according to claim 35, wherein the light pixels and dark pixels are formed of diffractive gratings, wherein the gratings of the light pixels and of the dark pixels differ by the grating period and/or grating depth and/or orientation.

37. The multilayer body according to claim 36, wherein the grating period of the diffractive gratings lies in a range of from 200 nm to 20 μm and/or the grating depth of the diffractive gratings lies in a range of from 50 nm to 2 μm and/or the grating depth of the diffractive gratings is 5% to 20% of the grating period.

38. The multilayer body according to claim 35, wherein the light pixels and dark pixels are formed by structures appearing light or dark in direct reflection, wherein the structures appearing dark comprise high-frequency and deep crossed grating structures and/or crossed gratings and/or hexagonal gratings and/or mirrors, and/or wherein the structures appearing light comprise static and/or dynamic matte structures and/or Fourier holograms.

39. The multilayer body according to claim 38, wherein the grating period of the crossed gratings and/or hexagonal gratings lies in a range of from 200 nm to 450 nm and the grating depth of the crossed gratings and/or hexagonal gratings is more than 150 nm.

40. The multilayer body according to claim 38, wherein the average spacing of the matte structures lies in a range of from 500 nm to 5 μm and the average depth of the matte structures lies in a range of from 100 nm to 2 μm.

41. The multilayer body according to claim 35, wherein the light pixels and dark pixels are formed by blazed gratings, wherein the orientation of the blazed grating in the light pixels and the dark pixels differs by at least 150°.

42. The multilayer body according to claim 41, wherein the grating period of the blazed gratings lies in a range of from 3 μm to 20 μm and/or the grating depth of the blazed gratings lies in a range of from 500 nm to 2 μm.

43. The multilayer body according to claim 32, wherein the first graphic code is a machine-readable code.

44. The multilayer body according to claim 32, wherein the first graphic code is a batch-specific code.

45. The multilayer body according to claim 32, wherein a second graphic code is applied in the form of a print in front of the replication layer by applying the print to the carrier layer and/or to a detachment layer and/or to a protective layer at least partially in a second region, and/or wherein the second graphic code is applied in the form of a print behind the replication layer by applying the print to the replication layer and/or a metal layer and/or an HRI layer and/or an adhesive layer and/or a primer layer at least partially in a second region.

46. The multilayer body according to claim 45, wherein the second graphic code is a machine-readable code.

47. The multilayer body according to claim 45, wherein the second graphic code is a unique code.

48. The multilayer body according to claim 45, wherein the first region and the second region are arranged adjoining each other or spaced apart from each other or overlapping each other at least in regions.

49. The multilayer body according to claim 32, wherein the multilayer body has at least one compensation layer.

50. The multilayer body according to claim 32, wherein the binarized two-dimensional Fourier pattern has an effective resolution of at most 2500 dpi.

51. A method for authenticating the multilayer body according to claim 32, with an authentication system, the method comprising:

capturing an image of a binarized two-dimensional Fourier pattern of the multilayer body with a camera of a mobile terminal, Fourier back-transforming the captured image and supplying the Fourier back-transformed image to a first read algorithm for a first graphic code and reading out the first graphic code and checking the first graphic code.

52. The method according to claim 51, wherein a second graphic code of the multilayer body is also captured when the image is captured, the captured image is supplied to a second read algorithm for the second graphic code and the second graphic code is read out and the read-out first graphic code and the second read-out graphic code are checked.

53. The method according to claim 52, wherein the read-out second graphic code is supplied to the authentication server and is compared with valid second graphic codes stored on the authentication server and the read-out second graphic code is authenticated if it matches one of the stored valid second graphic codes.

54. The method according to claim 52, wherein the multilayer body is authenticated if the first graphic code has been authenticated or if both the first graphic code and the second graphic code have been authenticated.

55. The method according to claim 52, wherein the multilayer body is authenticated if the combination of read-out first graphic code and read-out second graphic code have been authenticated.

56. The method according to claim 51, wherein a batch number is provided by the reading-out of the first graphic code and a serial number is provided by the reading-out of the second graphic code, and in that the batch number and the serial number are checked.

57. The method according to claim 51, wherein the read-out first graphic code is supplied to an authentication server and is compared with valid first graphic codes stored on the authentication server and the read-out first graphic code is authenticated if it matches one of the stored valid first graphic codes.

58. An authentication system for authenticating the multilayer body according to claim 32 comprising:

a mobile terminal with a camera for capturing the image of the binarized two-dimensional Fourier pattern of the multilayer body protected against forgery and a transceiver unit, with which data of the multilayer body captured by the camera can be transmitted to an authentication server, a Fourier back-transformation program, with which the binarized two-dimensional Fourier pattern can be Fourier back-transformed, a first read algorithm for the first graphic code, which is read out from the Fourier back-transformed image, an authentication server, which is in data-carrying connection with the mobile terminal and on which read-out first graphic code stored multilayer body, are stored and on which the read-out first graphic code transmitted by the mobile terminal can be authenticated and with which an authentication signal can be output to the mobile terminal.

* * * * *